(12) United States Patent
Pabla et al.

(10) Patent No.: US 7,127,613 B2
(45) Date of Patent: Oct. 24, 2006

(54) SECURED PEER-TO-PEER NETWORK DATA EXCHANGE

(75) Inventors: Kuldip Singh Pabla, Santa Clara, CA (US); William J. Yeager, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 782 days.

(21) Appl. No.: 10/082,385

(22) Filed: Feb. 25, 2002

(65) Prior Publication Data

US 2003/0163697 A1    Aug. 28, 2003

(51) Int. Cl.
*H04L 9/00* (2006.01)
*G06F 15/173* (2006.01)

(52) U.S. Cl. .................. 713/171; 713/156; 713/175; 709/224; 709/225; 380/277; 380/278

(58) Field of Classification Search ............. 713/171, 713/175, 156; 709/224, 225; 380/277, 278
See application file for complete search history.

(56) References Cited

U.S. PATENT DOCUMENTS

| | | | |
|---|---|---|---|
| 5,220,657 A | 6/1993 | Bly et al. | |
| 5,479,514 A * | 12/1995 | Klonowski | 380/277 |
| 5,619,657 A | 4/1997 | Sudama et al. | |
| 5,627,892 A | 5/1997 | Kauffman | |
| 5,671,428 A | 9/1997 | Muranaga et al. | |
| 5,745,574 A | 4/1998 | Muftic | |
| 5,812,793 A | 9/1998 | Shakib et al. | |
| 5,832,514 A | 11/1998 | Norin et al. | |
| 5,896,503 A | 4/1999 | Badovinatz et al. | |
| 5,987,446 A | 11/1999 | Corey et al. | |
| 5,995,951 A | 11/1999 | Ferguson | |
| 6,029,192 A | 2/2000 | Hill et al. | |
| 6,067,551 A | 5/2000 | Brown et al. | |
| 6,078,914 A | 6/2000 | Redfern | |
| 6,134,550 A | 10/2000 | Van Oorschot et al. | |
| 6,182,136 B1 | 1/2001 | Ramanathan et al. | |
| 6,233,601 B1 | 5/2001 | Walsh | |
| 6,269,099 B1 | 7/2001 | Borella et al. | |
| 6,446,113 B1 | 9/2002 | Ozzie et al. | |
| 6,473,761 B1 | 10/2002 | Shigemori et al. | |
| 6,584,493 B1 | 6/2003 | Butler | |
| 6,611,872 B1 | 8/2003 | McCanne | |

(Continued)

OTHER PUBLICATIONS

Abdul-Rahman et al., "A Distributed Trust Model," 1997 New Security Paradigms Workshop, ACM 1998, (pp. 48-59).

(Continued)

*Primary Examiner*—Emmanuel L. Moise
*Assistant Examiner*—Courtney Fields
(74) *Attorney, Agent, or Firm*—Robert C. Kowert; Meyertons, Hood, Kivlin, Kowert & Goetzel, P.C.

(57) ABSTRACT

A system and method for providing secure exchange of messages between peers in peer groups. Embodiments may be used to provide secured sessions between peers in the peer-to-peer network. Embodiments may also be used to provide secured group sessions among a plurality of peers. A first peer may generate and send a public key to a second peer. The second peer may generate a session key from the public key. The second peer may send the session key to the first peer, or alternatively to two or more peers in a group session. The session key may be secured when sending. Messages and/or other data exchanged between the two peers may be encrypted and decrypted using the session key.

65 Claims, 13 Drawing Sheets

U.S. PATENT DOCUMENTS

| | | |
|---|---|---|
| 6,657,116 B1 | 12/2003 | Gunnerson |
| 6,658,540 B1 | 12/2003 | Sicola et al. |
| 6,671,746 B1 | 12/2003 | Northrup |
| 6,681,282 B1 | 1/2004 | Golden et al. |
| 6,687,878 B1 | 2/2004 | Eintracht et al. |
| 6,697,944 B1 | 2/2004 | Jones et al. |
| 6,810,259 B1 | 10/2004 | Zhang |
| 6,854,016 B1 | 2/2005 | Kraenzel et al. |
| 6,892,230 B1 | 5/2005 | Gu et al. |
| 6,938,095 B1 | 8/2005 | Basturk et al. |
| 6,963,867 B1 | 11/2005 | Ford et al. |
| 2002/0027567 A1 | 3/2002 | Niamir |
| 2002/0052885 A1 | 5/2002 | Levy |
| 2002/0062375 A1 | 5/2002 | Teodosiu et al. |
| 2002/0065848 A1 | 5/2002 | Walker et al. |
| 2002/0071099 A1 | 6/2002 | Kurtz et al. |
| 2002/0073075 A1 | 6/2002 | Dutta et al. |
| 2002/0073204 A1 | 6/2002 | Dutta et al. |
| 2002/0138471 A1 | 9/2002 | Dutta et al. |
| 2002/0138576 A1 | 9/2002 | Schleicher et al. |
| 2002/0184311 A1 | 12/2002 | Traversat et al. |
| 2003/0009570 A1* | 1/2003 | Moskowitz et al. ........ 709/229 |
| 2003/0009660 A1 | 1/2003 | Walker |
| 2003/0028585 A1 | 2/2003 | Yeager et al. |
| 2003/0055892 A1 | 3/2003 | Huitema et al. |
| 2003/0055894 A1 | 3/2003 | Yeager et al. |
| 2003/0055898 A1 | 3/2003 | Yeager et al. |
| 2003/0056093 A1* | 3/2003 | Huitema et al. ............ 713/156 |
| 2003/0061287 A1 | 3/2003 | Yu et al. |
| 2003/0070070 A1 | 4/2003 | Yeager et al. |
| 2003/0105812 A1 | 6/2003 | Flowers et al. |
| 2003/0115251 A1* | 6/2003 | Fredrickson et al. ........ 709/201 |
| 2003/0152034 A1 | 8/2003 | Zhang et al. |
| 2003/0191828 A1 | 10/2003 | Ramanathan et al. |
| 2003/0191933 A1 | 10/2003 | Xu et al. |
| 2003/0206638 A1 | 11/2003 | Xu et al. |
| 2003/0212804 A1 | 11/2003 | Hashemi |
| 2004/0006586 A1 | 1/2004 | Melchione et al. |
| 2004/0019514 A1 | 1/2004 | Verbeke et al. |
| 2004/0039781 A1 | 2/2004 | LaVallee et al. |
| 2004/0088348 A1 | 5/2004 | Yeager et al. |
| 2004/0088369 A1 | 5/2004 | Yeager et al. |
| 2004/0088646 A1 | 5/2004 | Yeager et al. |
| 2004/0133640 A1 | 7/2004 | Yeager |
| 2005/0086300 A1 | 4/2005 | Yeager et al. |
| 2005/0251539 A1 | 11/2005 | Parekh et al. |

OTHER PUBLICATIONS

Zacharia et al., "Trust Management Through Reputation Mechanisms," Applied Artificial Intelligence, 2000, 14:881-907.

"Frequently Asked Questions about PGPi," http://web.archive.org/web/20020207220715/http://stale.schumacher.no/email.shtml, Mar. 2, 2001, (9 pages).

Bill Yeager, "Self Constructing P2P Networks Using the Project JXTA P2P Protocols," http://netseminar.stanford.edu/sessions/2002-03-14.html, Mar. 14, 2002, (2 pages).

Cameron Ross Dunne, "Using Mobile Agents for Network Resource Discovery in Peer-to-Peer Networks," http://www.acm.org/sigs/sigecom/exchanges/volume_2_(01)/2.3-index.html, 2001, (11 pages).

Fung et al., "Part-Time MSC Project 1 Mid-Term Review report," Peer-to-Peer Networks & Mobile Agents, Oct. 31, 2001, (12 pages).

Sniffen, "Trust Economies in the Free Haven Project," May 22, 2000, pp. 1-38.

Oram, "Peer-to-Peer: Harnessing the Benefits of a Disruptive Technology," Mar. 2001, O'Reilly & Associates, First Edition, Chapters 16 and 18.

Alan Beecraft, "Peer-to-Peer: From JMS to Project JXTA Part1: Shall we Chat?," http://java.sun.com/developer/technical/articles/peer/, Nov. 2001, 5 pages.

"LICQ Info," http://web.archive.org/web/20010808110229/www.licq.org/info.html, Aug. 8, 2001, 4 pages.

Oshima et al., "Aglets Specification 1.1 Draft," Sun Microsystems, Sep. 8, 1998, (40 pages).

"Project JXTA: An Open, Innovative Collaboration," Sun Microsystems, Inc., Apr. 25, 2001, (7 pages).

"JXTA v1.0 Protocols Specification," Sun Microsystems, Inc., 2002, (86 pages).

Traversat et al., "Project JXTA Virtual Network," Sun Microsystems, Inc., Feb. 5, 2002, (10 pages).

Lange et al., "Mobile Agents with Java: The Aglet API," World Wide Web, vol. 1, Issue 3, 1998, (pp. 111-121).

Ku, et al., "An Intelligent Mobile Agent Framework for Distributed Network Management," IEEE, 1997, pp. 160164.

* cited by examiner

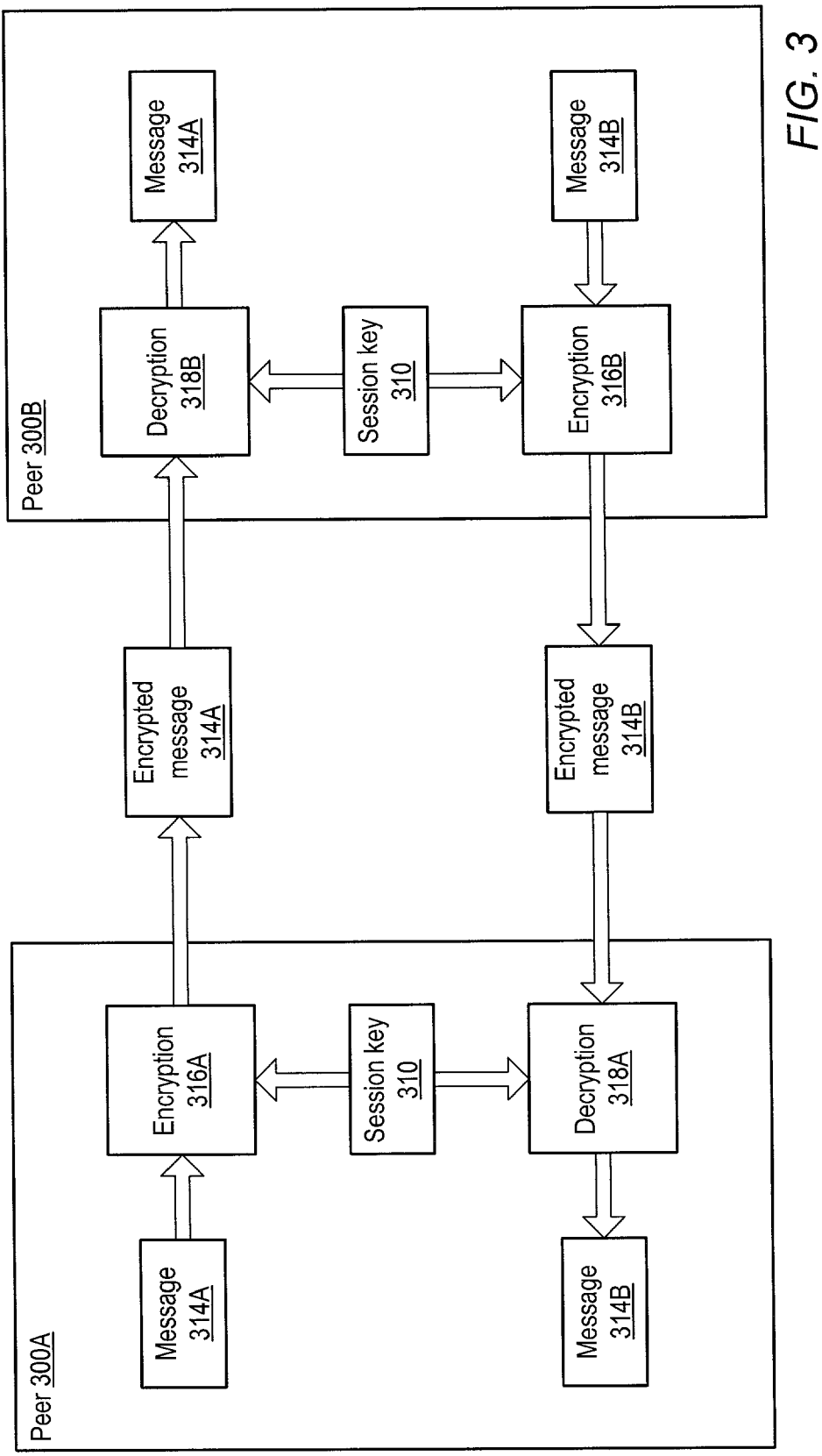

Policy Advertisement

| Element Name (A String) | Element Value Type |
|---|---|
| Policy Name | A non-canonical resource name (suitable for UI display) |
| Policy Keywords | String[] |
| Policy Resolver | <Peer Endpoint> to which the query generation and resolve messages are to be sent |

*FIG. 14*

Peer Advertisement

| Element Name (A String) | Element Value Type |
|---|---|
| Peer Endpoint | <Peer Endpoint[]> |

*FIG. 15*

Peer Group Advertisement

| Element Name (A String) | Element Value Type |
|---|---|
| Membership Application Policy | <Policy Advertisement> |
| New Member Approval Policy (Authentication) | <Policy Advertisement> |
| Content Sharing Policy | <Policy Advertisement> |
| Peer Discovery Policy | <Policy Advertisement> |
| Policy Resolver Policy | <Policy Advertisement> |
| Pipe Resolver Policy | <Policy Advertisement> |

*FIG. 16*

Pipe Advertisement

| Element Name (A String) | Element Value Type |
|---|---|
| Direction | <Pipe Direction> (In or Out) |

*FIG. 17*

Service Advertisement

| Element Name (A String) | Element Value Type |
|---|---|
| Access Policy | <Policy Advertisement> |

*FIG. 18*

Content Advertisement

| Element Name (A String) | Element Value Type |
|---|---|
| Type (Optional) | String |
| Size (Required) | Long |
| Encoding (Required) | <By Value> or <By Reference> |
| Content ID (Required) | <Content ID> |
| About ID (Optional) | <Content ID> |
| Peer ID (Optional) | <Peer Advertisement> |

*FIG. 19*

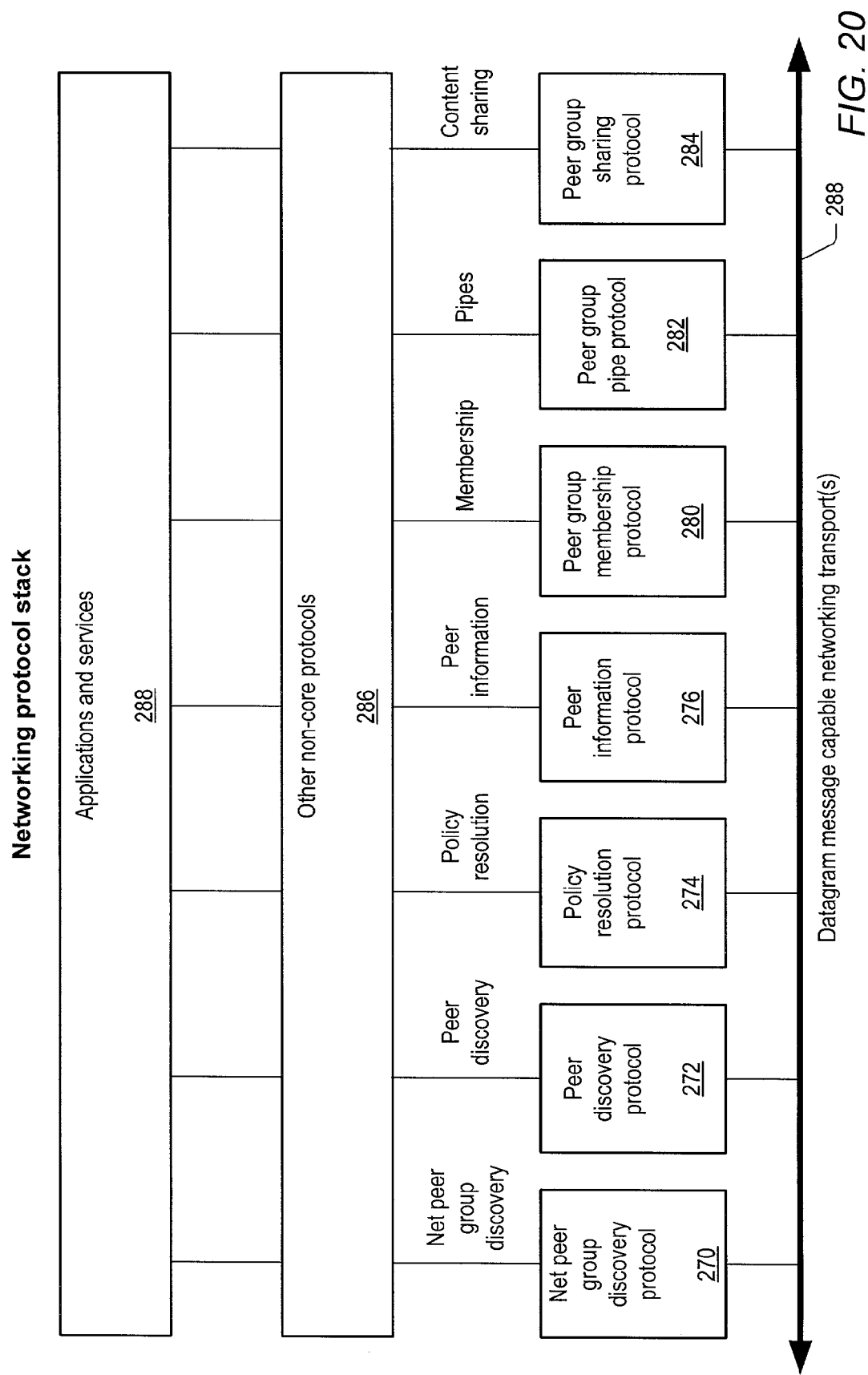

SECURED PEER-TO-PEER NETWORK DATA EXCHANGE

BACKGROUND OF THE INVENTION

1. Field of the Invention

This invention relates to peer-to-peer networking, and more particularly to a system and method for the secure exchange of messages and other data between peers in a peer-to-peer environment.

2. Description of the Related Art

The term peer-to-peer (also referred to as P2P) networking may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems. The peer-to-peer model may also help to reduce the load on server systems by allowing peers to bypass the server for information, file exchange, and some resource sharing, allowing the servers to perform services which require the specialized hardware and/or software of a "dedicated" server system.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

On the Internet, peer-to-peer may refer to a type of transient network that allows a group of computer users (peers) to connect with each other and directly access resources from one another's computer systems. Resources may include, but are not limited to, hardware and software resources such as files, disks, chat messages, applications, and printers, among others. A user must first download and execute the peer-to-peer networking program. After launching the program, the user enters the address (e.g. IP address) of another computer belonging to the network. Once the computer finds another network member on-line, it may connect to that user's connection (who has gotten their IP address from another user's connection and so on). Users may choose how many member connections to seek at one time and determine which resources (e.g. files) they wish to share or password protect. Napster and Gnutella are examples of this kind of peer-to-peer software.

On the Internet, "chat" may refer to two or more users "talking" over the Internet by exchanging messages while using the Internet at the same time. Chatting may involve the exchange of typed-in messages requiring one site as the repository for the messages (or "chat site") and a group of users who take part from anywhere on the Internet. Chats may be conducted on online services (e.g. America Online), by bulletin board services, and by Web sites, for example. Several Web sites, e.g. Talk City, exist solely for the purpose of conducting chats. Talk City and many other chat sites use a protocol called Internet Relay Chat. Alternatively, some peer-to-peer platforms may provide a mechanism for users to join in a chat session and exchange messages or other data directly without requiring one site as a message repository.

Prior to the development of the peer-to-peer model, computer users' systems connected to the Internet were typically relegated to being clients in a client/server model. When operating in some peer-to-peer models on the Internet or other networks, a peer system may operate outside of the Domain Name System (DNS), and thus may operate independently from the client/server model of the network that may include DNS servers and other servers. In a peer-to-peer network, a peer device or node, which may be referred to simply as a "peer," may bypass servers to remotely access resources (e.g. files) and information from other peers. Peers in the peer-to-peer network typically may share information and resources with other peers, and may exchange and search for information and resources on a network of users (peers) with common interests. Peers in a peer-to-peer network may also participate in "chat" by exchanging messages.

Public Key/Private Key Encryption

A public key may be defined as a value, provided by some designated, trusted authority, that, combined with a private key derived from the public key (or vice versa), can be used to effectively encrypt and decrypt messages and other data (e.g. files), and that may also be used as a digital signature. A public and private key may be created, in some instances simultaneously, using the same algorithm. A popular algorithm for generating public/private keys is the RSA (Rivest-Shamir-Adleman) algorithm. Other algorithms may also be used, such as TLS (Transport Layer Security). The use of combined public and private keys is known as asymmetric cryptography. Given a private key it is computationally infeasible to determine the public key (and vice-versa).

In a peer-to-peer network, two or more peers may desire to exchange secured messages, for example during a chat session. A peer in a peer-to-peer network may also desire to securely provide resources such as files or other data to one or more other peers. Thus, it may be desirable to provide a method for peers to exchanges messages and/or data, for example using public key/private key encryption. However, since peers in the peer-to-peer network may operate outside of the DNS and independently from the client/server model, typically there is no central server or authority to manage security, specifically public key/private key encryption, for peer groups such as the groups illustrated in FIGS. 1A and 1B. Therefore, it may be desirable to provide a method for peers in a peer-to-peer network to participate in secured message and/or data exchange independent of a central security authority.

SUMMARY OF THE INVENTION

Embodiments may be used to provide secured sessions (e.g. chat sessions) between two peers in a peer-to-peer networking environment. Embodiments may also be used to provide secured group sessions among a plurality of peers. Embodiments may also be used to provide secured transfers of other types of data (e.g. file transfers) between peers. Embodiments may also be used in other environments than peer-to-peer environments, for example, in client-server environments.

Before starting a session (e.g. chat session), two peers may negotiate to determine the terms and conditions for the session. In one embodiment, a public key may be generated on a first peer using a public key generation algorithm. If the first peer wants to have a secured session with a second peer, the first peer may send a message including the public key to the second peer. In one embodiment, the message may be a session request message indicating that a secured session is desired. The second peer may receive the message including the public key. The second peer may then determine if the requested secured session is to be established. In one embodiment, this determination may be made through user input to the network node hosting the second peer. If it is determined that a secured session is to be established, then a session key may be generated from the public key on the second peer using a session key generation mechanism. The generated session key may then be sent to the first peer in a message. In one embodiment, the session key may be encrypted using the public key or otherwise secured when sent to the first peer.

After the first peer receives the session key, the session key may be used by either peer to encrypt messages and/or other data to be sent to the other peer, and to decrypt encrypted messages and other data received from the other peer. Either peer, during the session, may generate a message or other data to be sent to the other peer. An encryption mechanism may be used to encrypt the message or other data using the session key. The encrypted message or other data may then be transmitted to the other peer via the peer-to-peer network. The other peer may receive the encrypted message, or other data and a decryption mechanism may then decrypt the encrypted message or other data to produce the decrypted message or other data using the session key. As no other peers on the peer-to-peer network possess the session key, no other peers can decrypt the messages encrypted using the session key and exchanged between the first and second peer during the session.

The two peers may use the session key for as long as the current session lasts. At some point, the session may be terminated. If, after termination, the two peers negotiate to establish another secured session, then a process similar to the one described above may be performed to generate a new session key that is different from the original session key used in the first session. Thus, in one embodiment, for each secured session established between any two peers in the peer-to-peer network, a new session key is generated. In one embodiment, this may include generating a new public key from which the new session key is generated for each new session. In other embodiments, the public key and/or session key may be saved for use in subsequent sessions.

In one embodiment, if it is determined that a secured session is not to be established, the second peer may send a message to the first peer indicating that the request was not accepted. In one embodiment, the message may include a NULL session key to indicate that a secured session is not to be established.

Peers may participate in a group session. Any number of two or more peers may join in a group session. In one embodiment, each pair of peers in the group session that desires to securely exchange messages and/or other data may generate a unique session key. Thus, each unique pair of peers shares a unique session key. Thus, each unique pair of peers in the group session may exchange secured messages. In one embodiment, a peer in the group session might not require the secure exchange of messages with one or more other peers in the group session. Two peers that do not require secure exchange may still exchange unencrypted messages. Thus, a peer may participate in the group session and not participate in the secure exchange of messages or other data with any other peers, and thus not require a shared session key. In addition, all peers may exchange unencrypted data in addition to encrypted data.

In another embodiment, one session key may be generated and provided to all members in the group session for encrypting and decrypting messages. In one embodiment, one of the peers in the group session may generate a public key, generate the session key from the public key, and provide the session key to other peers in the group session. In one embodiment, the session key may be secured when sending to other peers, for example using public key/private key encryption. Alternatively, one peer may generate a public key and send the public key to another peer in the group session, which may then generate the session key. In one embodiment, not all peers in a group session may require a session key. For example, some peers in a group session may be using secured message exchange with some other peers in the group session but not with other peers in the group session. If a peer is not involved in secured communication with other peers, then the peer may not require a session key. If a new peer joins the group session, the session key may be provided to the new peer if secured communications are desired between member peers of the group session and the new peer. In addition, all peers may exchange unencrypted data in addition to encrypted data.

BRIEF DESCRIPTION OF THE DRAWINGS

FIG. 3 illustrates peers in a peer-to-peer network exchanging an encrypted message using a session key in a secured session according to one embodiment;

FIG. 14 illustrates one embodiment of a policy advertisement;

FIG. 15 illustrates one embodiment of a peer advertisement;

FIG. 16 illustrates one embodiment of a peer group advertisement;

FIG. 17 illustrates one embodiment of a pipe advertisement;

FIG. 18 illustrates one embodiment of a service advertisement;

FIG. 19 illustrates one embodiment of a content advertisement; and

FIG. 20 is a block diagram illustrating one embodiment of a network protocol stack in a peer-to-peer platform.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

A system and method for providing secure exchange of messages between peers in peer groups is described. Embodiments may be used to provide secured sessions (e.g. chat sessions) between two peers in the peer-to-peer network. Embodiments may also be used to provide secured group sessions among a plurality of peers. Embodiments may also be used to provide secured transfers of other types of data (e.g. file transfers) between peers. Embodiments may also be used in other environments than peer-to-peer environments, for example, in client-server environments.

A novel open network computing platform for peer-to-peer networks, which may be referred to as a peer-to-peer platform, is described herein, and the system and method for providing the secure exchanges of messages and other data between peers as described herein may be used in peer-to-peer networking environments based upon the novel peer-to-peer platform.

Figure 1A:
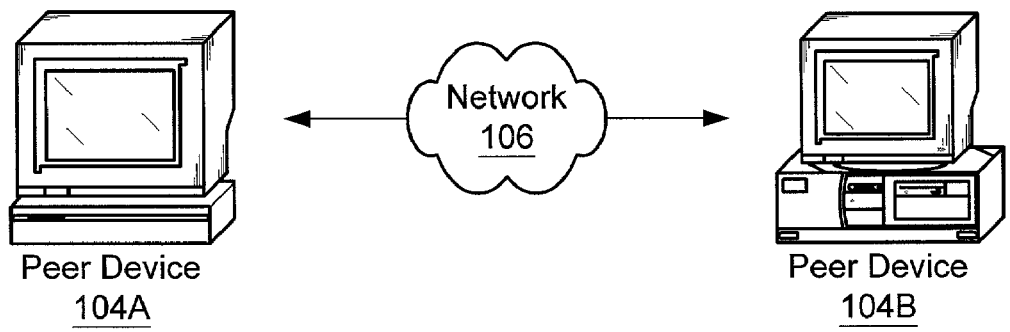
FIG. 1A illustrates a prior art example of two devices that are currently connected as peers.
Figure 1B:
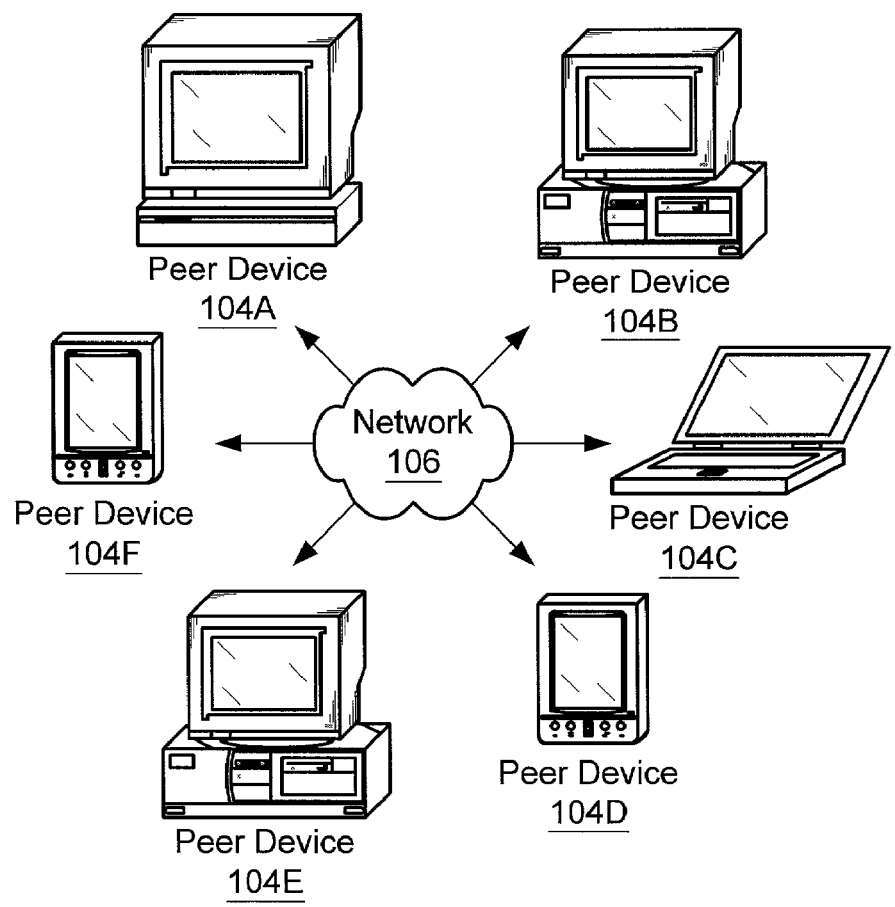
FIG. 1B illustrates a prior art example of several peer devices connected over the network in a peer group.
Figure 2:
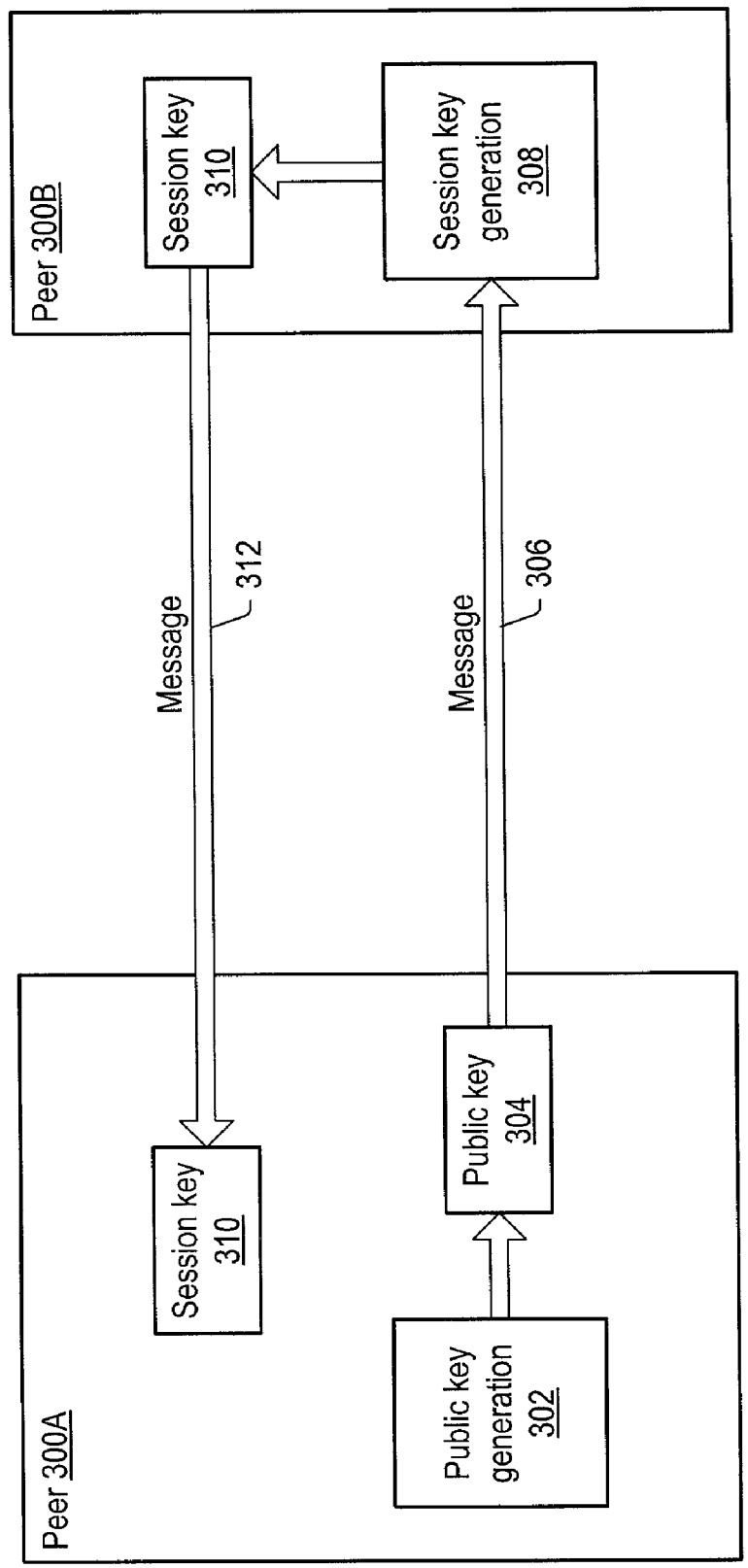
FIG. 2 illustrates peers in a peer-to-peer network generating a session key to be used in a secured session according to one embodiment.

FIG. 2 illustrates peers in a peer-to-peer network generating a session key to be used in a secured session according to one embodiment. Before starting a session (e.g. chat session), two peers 300 may negotiate to determine the terms and conditions for the session. In one embodiment, a public key 304 may be generated on peer 300A using a public key generation mechanism 302. A private key (not shown) corresponding to the public key 304 may also be generated. Embodiments of a public key generation mechanism are described later in this document. If peer 300A wants to have a secured session with peer 300B, then peer 300A may send a message 306 including the public key 304 to peer 300B. In one embodiment, the message 306 may be a session request message indicating that a secured session is desired. In one embodiment, a plurality of messages may be exchanged between peer 300A and 300B during session negotiation, and at least one of the messages may include the public key 304.

Peer 300B may receive the message 306 including the public key 304. It may then be determined on peer 300B if the requested secured session is to be established. In one embodiment, this determination may be made through user input to the network node hosting peer 300B. If it is determined that a secured session is to be established, then a session key 310 may be generated on peer 300B from the public key using a session key generation mechanism 308. Embodiments of a session key generation mechanism are described later in this document. The generated session key 310 may then be sent from peer 300B to peer 300A in a message 312. In one embodiment, the message 312 may be encrypted. In one embodiment, the public key 304 generated on peer 300A and sent to peer 300B may be used to encrypt the message 312 on peer 300B. Peer 300A may then use the private key corresponding to the public key to decrypt the encrypted message 312 and thus retrieve the session key 310.

After peer 300A receives the session key 310, the session key 310 may be used by both peers 300 to encrypt messages and other data to be sent to the other peer, and to decrypt encrypted messages and other data received from the other peer. As no other entities on the network have the session key 310, messages encrypted using the session key 310 and exchanged between peer 300A and 300B during the session are secured from other entities on the network. The exchange of encrypted messages between peers is further illustrated in FIG. 3.

The peers may use the session key 310 for as long as the current session lasts. At some point, the session may be terminated. If, after termination, the two peers 300A and 300B negotiate to establish another secured session, then a process similar to the one described above may be performed to generate a new session key 310 which is different from the original session key 310 used in the first session. Thus, in one embodiment, for each secured session established between any two peers in the peer-to-peer network, a new session key is generated. In one embodiment, this may include generating a new public key from which the new session key is generated for each new session. Thus, in the unlikely event that some entity on the network manages to "steal" the original session key 310, the stolen session key would be of no use once a new session is established. In other embodiments, the public key and/or session key may be saved for use in subsequent sessions. In one embodiment, for example, the public key may be generated and stored for subsequent sessions. In another embodiment, both the public key and the session key may be generated, used for a session, and stored for subsequent sessions.

In one embodiment, if it is determined that a secured session is not to be established, peer 300B may send a message to peer 300A indicating that the request was not accepted. In one embodiment, the message may include a NULL session key to indicate that a secured session is not to be established. In one embodiment, if it is determined that a secured session is not to be established, the two peers may negotiate to establish an unsecured session. In this embodiment, the two peers participating in the unsecured session may still decide at some point to generate a session key 310 as described above to exchange at least some messages in a secured fashion.

As noted, a plurality of peers may participate in a chat session. In one embodiment, within a peer group, participation of the peers in the chat session is optional, e.g. the peers within the peer group may choose to participate or not to participate in the chat session. All of the peers participating in the chat session receive the same messages, whether secured or unsecured. In one embodiment, if a secured chat session is established, all of the peers in the peer group participating in the secured chat session exchange secured messages. In another embodiment, the peers may exchange both unsecured and secured messages. In one embodiment, if the peers participating in the chat session are part of two or more different groups and/or two or more different subgroups, some of the peers may participate in secured chat and some may participate in unsecured chat.

Any of a variety of methods may be used to generate public keys and session keys. In one embodiment, an RSA (Rivest-Shamir-Adleman) 512-bit public key algorithm may be used, and a RC4 128-bit cipher. RC4 is a variable key-size stream cipher with byte-oriented operations. The algorithm is based on the use of a random permutation. For each session, the initiating peer may generate an RSA public/private key pair, and may send the public key unsigned to the receiving peer, for example, in a session request message. The receiving peer may create a 128-bit session key using a pseudo-random number generator, encrypt in the initiating peer's public key, and send the results back to the initiating peer. The initiating peer may then decrypt the session key with its private key. The session key, now shared by the initiating and receiving peer, may then be used as the session key to encrypt and decrypt messages and other data during the session. In one embodiment, a 1024-bit RSA key may be used.

In another embodiment, TLS (Transport Layer Security) may be used for generating session keys instead of the above method. TLS is a protocol that ensures privacy between two parties, for example communicating applications and their users or peers in a peer-to-peer environment, on the Internet. When two parties communicate, TLS ensures that no third party may eavesdrop or tamper with any message. TLS is composed of two layers: the TLS Record Protocol and the TLS Handshake Protocol. The TLS Record Protocol provides connection security with some encryption method such as the Data Encryption Standard (DES). The TLS Record Protocol can also be used without encryption. The TLS Handshake Protocol allows parties, for example a server and client or alternatively peers in a peer-to-peer network, to authenticate each other and to negotiate an encryption algorithm and cryptographic keys before data is exchanged.

A peer may be implemented in software, hardware or a combination thereof on any of a number of computing devices. These devices may include, but by no means are limited to: personal digital assistants (PDAs), cellular/mobile phones, notebook computers, laptops, desktop computers, workstations, more powerful computer systems such as mainframes and high-end servers, even supercomputers. In addition, a device may host one or more peers simultaneously. The system and method for providing secured peer-to-peer communications as described herein may be implemented on those devices in software, hardware or a combination thereof.

FIG. 3 illustrates peers in a peer-to-peer network exchanging an encrypted message using a session key in a secured session according to one embodiment. A secured session may have been established, and the session key generated, by a method similar to that illustrated in FIG. 2. Peer 300A, during the session, may generate a message 314A to be sent to peer 300B. Each peer may have an encryption mechanism 316 and a decryption mechanism 318. These mechanisms may be implemented in hardware, software or a combination thereof. In one embodiment, the encryption and decryption mechanism may be included in one hardware or software module. An encryption mechanism 316A of peer 300A may encrypt the message 314A using the session key 310 generated as described in FIG. 2. The encrypted message 314A may then be transmitted to peer 300B via the peer-to-peer network. Peer 300B may receive the message, and a decryption mechanism 318B may then decrypt the encrypted message 314A to produce the decrypted message 314A using the session key 310 generated as described in FIG. 2. The same process may be reversed to encrypt messages on peer 300B using session key 310, transmit the messages to peer 300A, and decrypt the messages on peer 300A using the session key 310, as shown. Note that a similar method may be used to exchange data other than messages between peers 300A and 300B, for example, a file may be encrypted on peer 300A using the session key 310, and peer 300B may download the encrypted file and decrypt the file using the session key 310.

As an example of using the methods as described in FIGS. 2 and 3, a first peer on a peer-to-peer network may desire to establish a secured chat session with a second peer. The first peer may generate a public key and send the message to the second peer. The public key may be sent in a message requesting the secured chat session, or alternatively in a separate message. Upon receiving the public key, if the second peer decides to establish the secured chat session, the second peer may generate a session key and send the session key to the first peer in a message as described in FIG. 2. After both peers have the session key, they may begin securely exchanging chat messages encrypted with the session key.

As another example of using the methods as described in FIGS. 2 and 3, a first peer on a peer-to-peer network may desire to securely download one or more files or other downloadable resource from a second peer on a peer-to-peer network. The first peer may generate a public key and send the message to the second peer. The public key may be sent in a message requesting a secured session, or alternatively in a separate message. Upon receiving the public key, if the second peer decides to allow the secured session to download files, the second peer may generate a session key and send the session key to the first peer in a message as described in FIG. 2. After both peers have the session key, the first peer may securely download one or more files or other downloadable resource from the second peer encrypted with the session key.

Figure 4:
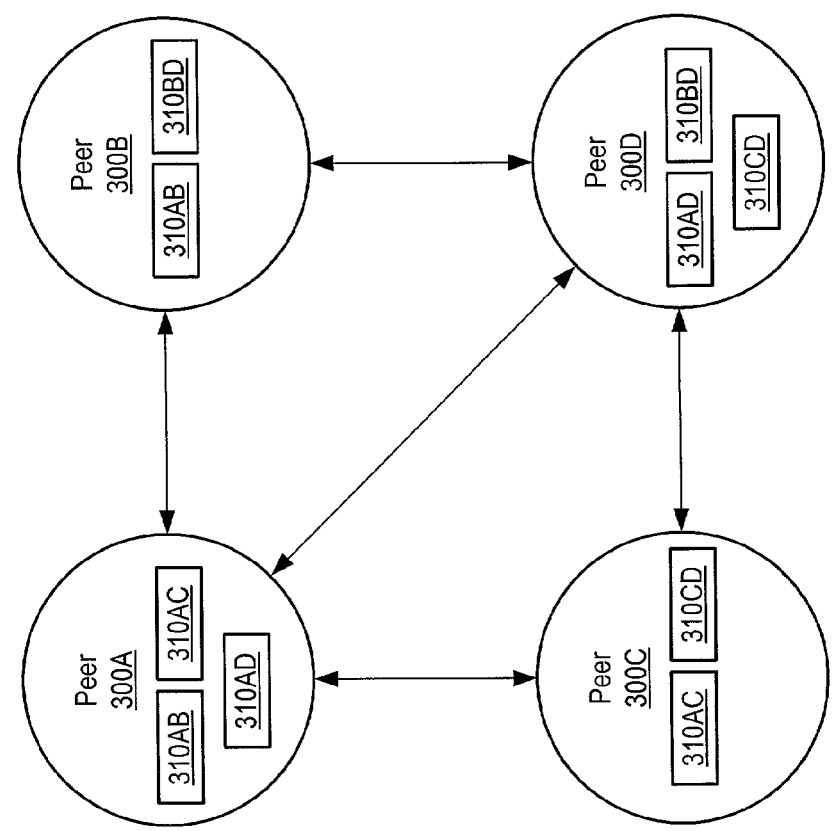
FIG. 4 illustrates a group session of peers where each unique pair of peers that desires to exchange secured messages shares a unique session key according to one embodiment.

FIG. 4 illustrates a group session of peers where each unique pair of peers that desires to exchange secured messages shares a unique session key according to one embodiment. FIGS. 2 and 3 illustrate two peers 300 joining in a secured session. In FIG. 4, a group session has been established, in this example, with four peers 300 participating. Note that any number of three or more peers 300 may join in a group session. Each pair of peers 300 in the group session that desires to securely exchange messages and/or other data may generate a unique session key 310 using a method similar to that described in FIG. 2. Thus, each unique pair of peers 300 in the group session shares a unique session key 310. Note that all peers 300 in the group session may still exchange unsecured messages with other peers when participating in the group session, including pairs of peers that do not share a session key.

In this example, peer 300A is communicating with peers 300B, 300C and 300D. Thus, peer 300A includes three session keys for encrypting/decrypting messages: 310AB for secure communications with peer 300B, 310AC for peer 300C, and 310AD for peer 300D. Peer 300B is communicating with peers 300A and 300D. Thus, peer 300B includes two session keys for encrypting/decrypting messages: 310AB for secure communications with peer 300B and 310BD for peer 300D. Peer 300C is communicating with peers 300A and 300D. Thus, peer 300C includes two session keys for encrypting/decrypting messages: 310AC for secure communications with peer 300A and 310CD for peer 300D. Peer 300D is communicating with peers 300A, 300B and 300C. Thus, peer 300A includes three session keys for encrypting/decrypting messages: 310AD for secure communications with peer 300A, 310BD for peer 300B, and 310CD for peer 300C.

FIG. 4 shows (in peers 300B and 300C) that a peer 300 in a group session might not require the secure exchange of messages with one or more other peers 300 in the group session. Two peers 300 that do not require secure exchange may still exchange unencrypted messages. For example, peer 300B and 300C may exchange unencrypted messages. Note that a peer 300 may participate in the group session by exchanging unsecured message with other peers in the session and not participate in the secure exchange of messages with any other peers, and thus not require a shared session key 310.

Figure 5:
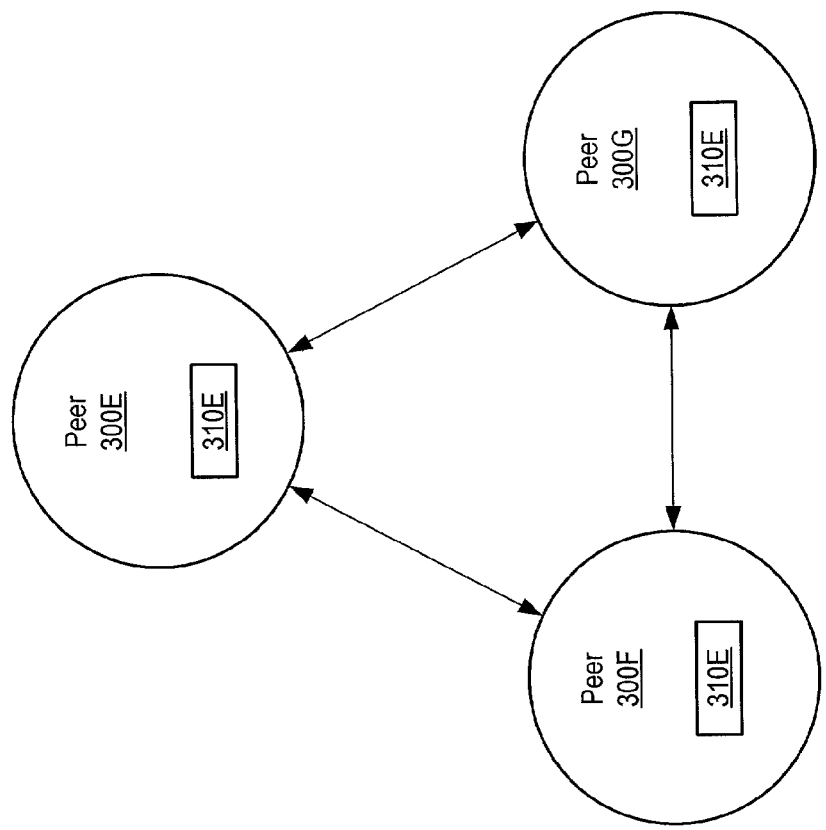
FIG. 5 illustrates a group session of peers where all of the peers share a common session key according to one embodiment.

FIG. 5 illustrates a group session of peers where all of the peers share a common session key according to one embodiment. FIGS. 2 and 3 illustrate two peers 300 joining in a secured session. In FIG. 5, a group session has been established, in this example, with three peers 300 participating. Note that any number of three or more peers 300 may join in a group session.

In this embodiment, unlike the embodiment illustrated in FIG. 4, one session key 310E may be generated and provided to all members in the group session for encrypting and decrypting messages and/or other data. In one embodiment, one of the peers 300 in the group session may generate a public key 304, generate the session key 310E from the public key, and provide the session key 310E to other peers in the group session. Alternatively, one peer 300 may generate a public key 304 and send the public key 304 to another peer 300 in the group session, which may then use the public key 304 to generate the session key 310E. To securely provide the session key 310E to the other peers, public key/private key encryption, or alternatively other methods of securely exchanging information over the network, may be used.

Note that in various embodiments of group sessions as illustrated in FIG. 5, not all peers 300 in a group session may require a session key 310. For example, some peers 300 in a group session may be using secured message exchange with some other peers 300 in the group session but not with other peers 300 in the group session. If a peer 300 is not involved in secured communication with other peers 300, then the peer 300 may not require a session key 310. If a new peer 300 joins the group session, the session key 310E may be provided to the new peer 300 if secured communications are desired between member peers 300 of the group session and the new peer 300. Peers 300 in the group session may still exchange unsecured messages and/or other data with other peers in the group, whether or not the peers 300 have the session key.

Figure 6:
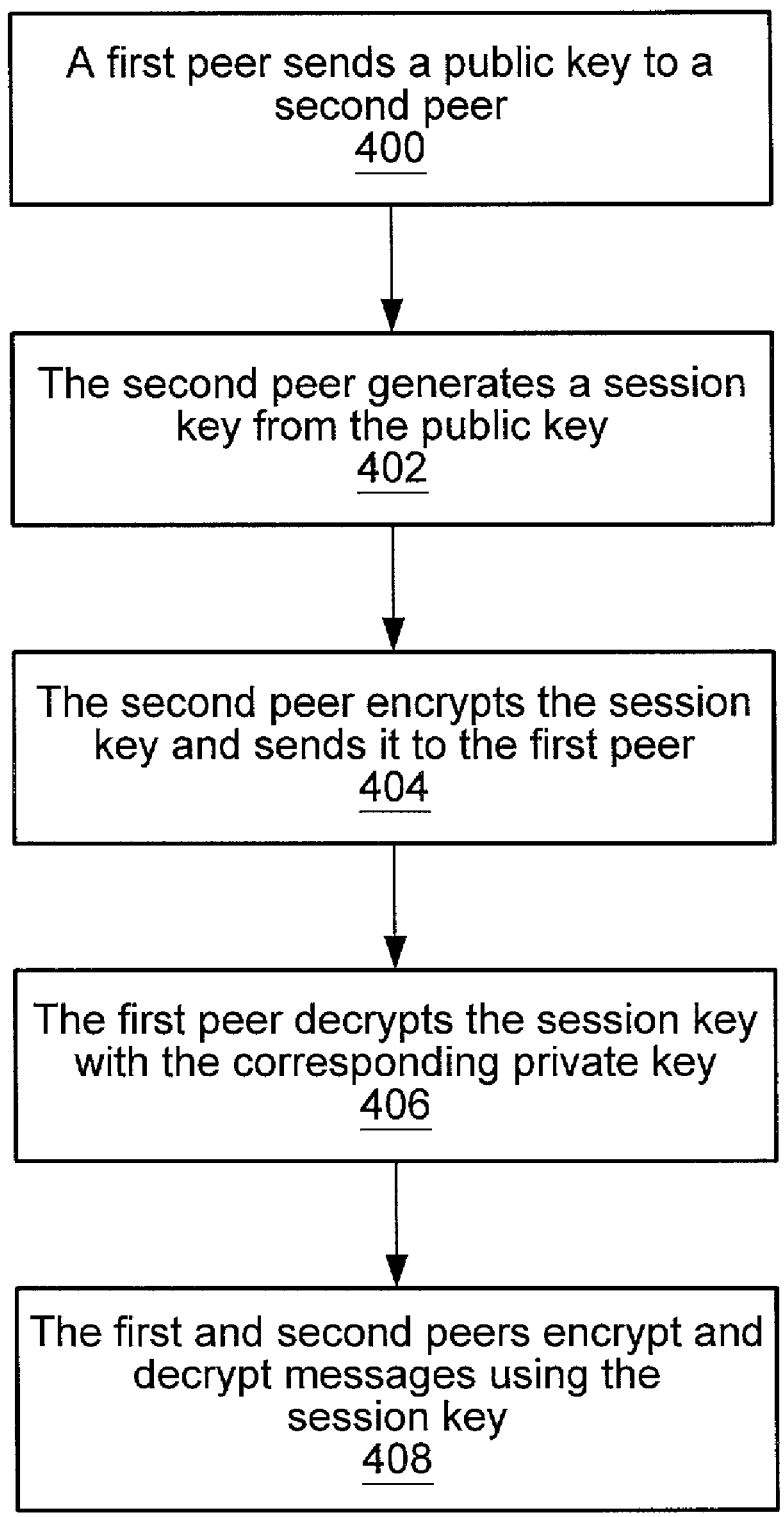
FIG. 6 is a flowchart illustrating a method of generating a session key to be used in a session according to one embodiment.

FIG. 6 is a flowchart illustrating a method of generating a session key to be used in a secured session by two or more peers according to one embodiment. In one embodiment, the method, 400, 402, and 404 of FIG. 6 may be performed during negotiation to determine the terms and conditions for a secured session between the peers in a peer-to-peer network. As indicated at 400, a first peer 300 sends a public key 304 to a second peer 300 on the peer-to-peer network. In one embodiment, the first peer 300 may first generate the public key 304. In one embodiment, the first peer 300 may send the public key 304 to the second peer 300 in a message requesting a secured session. As indicated at 402, the second peer 300, after receiving the public key 304, may generate a session key 310 from the public key 304. The second peer 300 then sends the session key 310 to the first peer 300 as indicated at 404.

In one embodiment, the message including the session key 310 may be encrypted prior to sending. The first peer 300 then may decrypt the message to obtain the session key as indicated at 406. In one embodiment, public key/private key encryption may be used. In one embodiment, the public key generated on the first peer and sent to the second peer may be used to encrypt the message on the second peer, and the corresponding private key may be used to decrypt the encrypted message on the first peer. Both peers may store the session key 310 in memory for used during the secured session. The first and second peers 300 then may encrypt and decrypt messages and/or other data such as files using the session key as indicated at 408. Since only the first and second peer 300 have the session key 310, only the first and second peer 300 are able to decrypt messages encrypted using the session key 310.

In one embodiment, a session key 310 may be only used during the session for which it was generated. When the session is terminated, the two peers 300 may dispose of the session key 310. If the two peers later negotiate to participate in another session, a new session key 310 may be generated. In one embodiment, anew public key 304 may be generated for use in generating the new session key 310.

Figure 7:
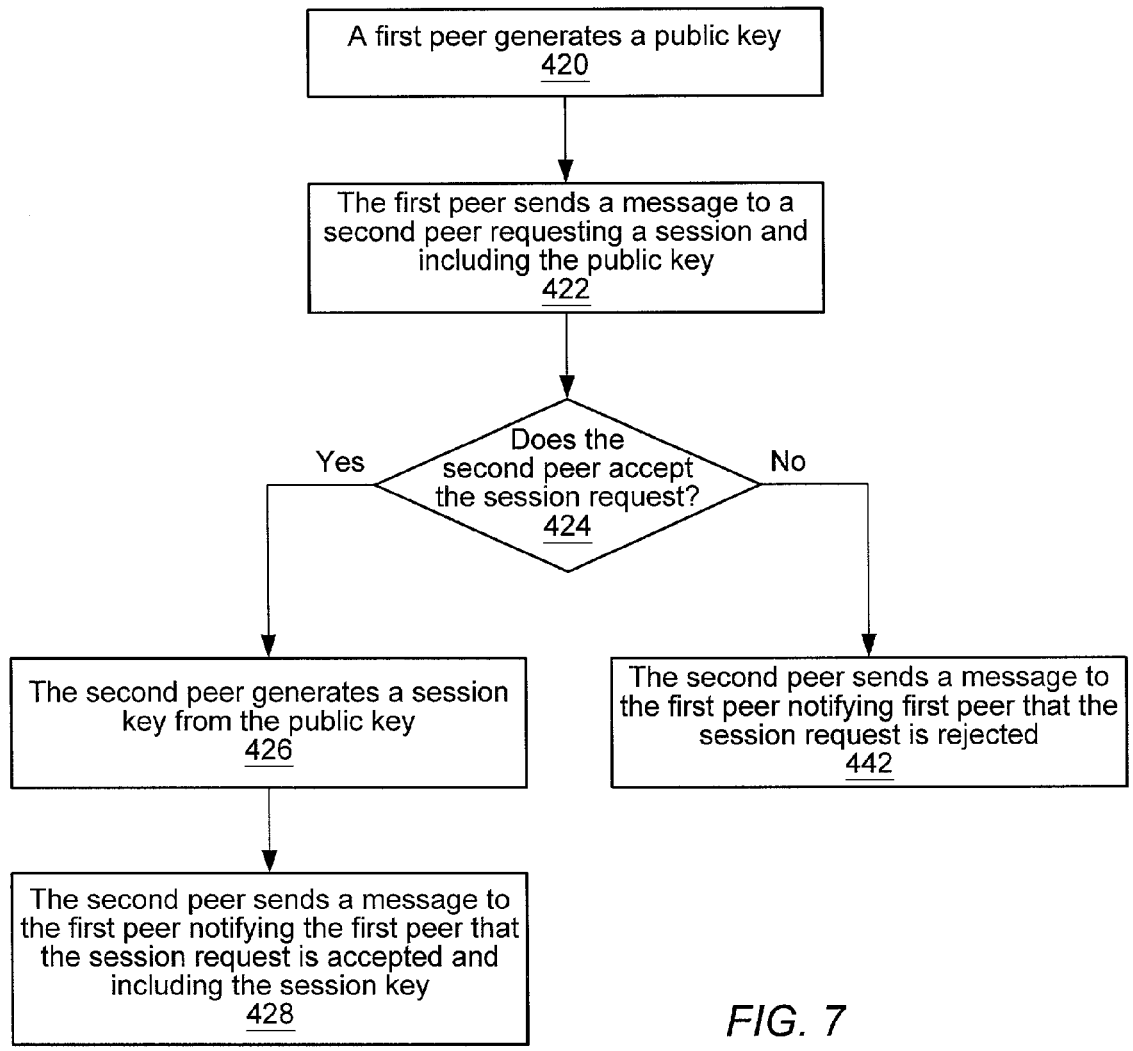
FIG. 7 is a flowchart illustrating a method of establishing a session in which a session key is to be used for the secure exchange of messages according to one embodiment.

FIG. 7 is a flowchart illustrating a method of establishing a session in which a session key is to be used for the secure exchange of messages or other data according to one embodiment. A first peer 300 in a peer-to-peer network may desire to establish a secured session (e.g. a chat session) with a second peer 300 in the peer-to-peer network. A request for a secured session may be generated in response to user input. For example, a user of the first peer 300 may desire to establish a peer-to-peer secured session to communicate and/or exchange data with a user of the second peer 300. Alternatively, a request for a secured session may be generated by a task executing within the peer node. For example, a task may be scheduled to execute automatically on a peer 300, request a secured session with another peer 300, and, if the session is established, send to and/or receive secured data from the other peer. As indicated at 420, the first peer 300 may first generate a public key 304. As indicated at 422, the first peer may then send a message to a second peer on the peer-to-peer network that requests a secured session (e.g. a chat session) with the second peer. In one embodiment, the generated public key 304 may be embedded in the message.

The second peer 300 may receive the message and determine if a secured session is to be established with the first peer 300 as indicated at 424. Determining if a secured session is to be established may be performed by a user of the second peer 300. For example, the request may be displayed on a user interface of the second peer 300, and the user may accept or reject the request through the user interface. Alternatively, the process of determining if a secured session is to be established may be automated.

If it is determined on the second peer 300 that a secured session is to be established, a session key 310 may be generated by the second peer 300 from the public key 304 received from the first peer 300 as indicated at 426. As indicated at 428, the second peer 300 may then send a message to the first peer 300 notifying the first peer 300 that the secured session request is accepted. The message may include the session key 310 generated by the second peer 300. Alternatively, the second peer 300 may send the session key 310 to the first peer 300 in a second message. In one embodiment, the message including the session key 310 may be encrypted. In one embodiment, the public key generated on the first peer and sent to the second peer may be used to encrypt the message on the second peer, and the private key corresponding to the public key may be used to decrypt the encrypted message on the first peer. Both peers may store the session key 310 in memory for used during the secured session. The first and second peers 300 may use the session key to encrypt and decrypt messages and/or other data such as files. Only the first peer 300 and the second peer 300 are able to decrypt messages encrypted using the session key 310 since only they have the session key.

If it is determined on the second peer 300 that a secured session is to be established, the second peer 300 may send a message to the first peer 300 notifying the first peer that the secured session request is rejected as indicated at 442. In one embodiment, a NULL session key 310 may be included in the message to indicate that the secured session request was not accepted. If a secured session is not established, then the two peers may still exchange unencrypted messages or other data in an unsecured session.

Figure 8:
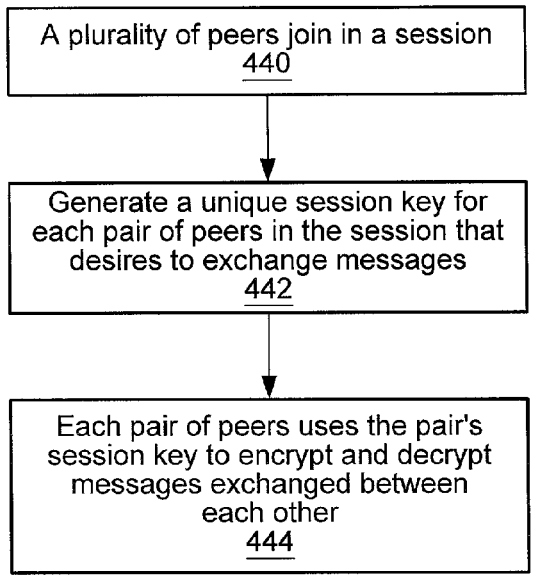
FIG. 8 is a flowchart illustrating a method of generating a unique session key to be used by each pair of peers in a group session for the secure exchange of messages according to one embodiment.

FIG. 8 is a flowchart illustrating a method of generating a unique session key to be used by each pair of peers in a group session for the secure exchange of messages according to one embodiment. As indicated at 440, a plurality of peers 200 may join in a group session on a peer-to-peer network. The peers in the group session may exchange unsecured message or other data. At least some of the peers in the group session may desire to exchange secured messages. For each pair of peers 300 that desires to exchange secured messages in the group session, a unique session key 310 may be generated as indicated at 442. As indicated at 444, each pair of peers 300 may then use the pair's session key 310 to encrypt and decrypt messages and/or other data to allow the secure exchange of the messages and/or other data. Other peers 300, including other peers 300 in the group session, do not have a particular pair's session key 310, and thus the pair can exchange messages and/or other data in a secured fashion. When a peer 300 joins the group session, a unique session key 310 may be generated for use with each peer 300 in the group session that the new peer 300 wishes to exchange encrypted messages or other data with. Thus, each peer 300 in the group session may have one or more session keys 310, with each session key 310 used to encrypt and decrypt messages and/or other data with a particular one of the other peers 300. In one embodiment, peers 300 may also exchange messages and/or other data without encrypting/decrypting the messages and/or data using a session key 310, and thus each pair of peers 300 in the group session may not require a unique session key 310.

Figure 9:
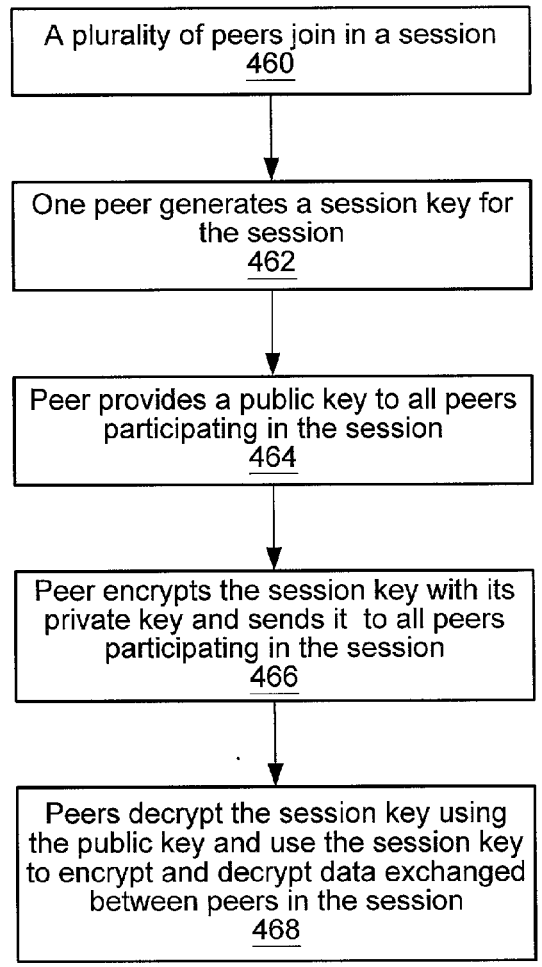
FIG. 9 is a flowchart illustrating a method of generating one session key to be used by each peer in a group session for the secure exchange of messages according to one embodiment.

FIG. 9 is a flowchart illustrating a method of generating one session key to be used by each peer in a group session for the secure exchange of messages according to one embodiment. As indicated at 460, a plurality of peers 200 may join in a group session on a peer-to-peer network. One or more of the plurality of peers may participate in generating a session key 310 for the group session as indicated at 462. In one embodiment, a first peer may generate a public key and send it to a second peer, which may then generate a session key 310 from the public key. In one embodiment, the RSA (Rivest-Shamir-Adleman) algorithm may be used to generate the public key. The receiving peer may then generate the session key 310 from the public key. Alternatively, one peer may generate a public key and use the public key to itself generate the session key 310.

The session key 310 may be provided to all peers 310 participating in the secured group session. In one embodiment, the peer that generated the session key 310 may send a public key to each of the peers that are to receive the session key 310 as indicated at 464. The peer may then encrypt the session key using the private key associated with the public key and send the session key to each peer in the session (e.g. in a message) as indicated at 466. Each peer 300 may then decrypt the session key 310 and use the session key 310 to encrypt and decrypt messages and/or other data exchanged with any other peer in the group as indicated at 468. Peers 300 that are not in the group session do not have the session key 310 and thus cannot decrypt messages and/or data transmitted between the peers 300 in the group session. When a peer 300 joins the group session, it may be provided with the session key 310 and thus can participate in the secured group session. Note that peers in the session may still exchange unencrypted messages and other data.

The methods as described in FIGS. 6 through 9 may be implemented in software, hardware, or a combination thereof on any of a number of computing devices that may host peers. The order of method may be changed, and various steps may be added, reordered, combined, omitted, modified, etc. These devices may include, but by no means are limited to: personal digital assistants (PDAs), cellular/mobile phones, notebook computers, laptops, desktop computers, workstations, more powerful computer systems such as mainframes and high-end servers, even supercomputers. The system and method may be implemented as software executable by the peer within the device. Alternatively, the system and method may be implemented as dedicated hardware that is accessible by the peer on the device. As another alternative, the system and method may be implemented as a combination of software and hardware on the device.

Peer-To-Peer Platform

Embodiments of the system and method for providing secure exchange of messages between peers in peer groups may be implemented in conjunction with a peer-to-peer platform. An exemplary peer-to-peer platform in which embodiments of the system and method is described below. Note that embodiments of the system and method may be integrated in the peer-to-peer platform or alternatively may be an external service that interfaces to the platform to provide the secure exchange of messages between peers on the platform.

Instead of deploying a single set of software (an OS, with its device drivers, and applications) on many hardware platforms, the peer-to-peer platform described herein creates a protocol-based network platform. This approach allows many network nodes to adopt one or more of the protocols of the platform. A "network node" is a node on the network that may participate in (i.e. be a peer in) the peer-to-peer network platform. The peer-to-peer platform may provide infrastructure services for peer-to-peer applications in the peer-to-peer model. The peer-to-peer platform may provide a set of primitives (infrastructure) for use in providing services and/or applications in the peer-to-peer distributed fashion. The peer-to-peer platform may provide mechanisms with which peers may find each other, cooperate with each other, and communicate with each other. Software developers may use the peer-to-peer platform as a standard to deploy inter-operable applications, services and content. Thus, the peer-to-peer platform may provide a base on which to construct peer-to-peer network computing applications on the Internet.

The peer-to-peer platform may provide a mechanism for dynamically creating groups and groups of groups. The peer-to-peer platform may also provide mechanisms for peers to discover (become aware of) other peers and groups, and mechanisms for peers and/or peer groups to establish trust in other peers and/or peer groups 304. The peer-to-peer platform may also provide a mechanism for monitoring peers and peer groups 304, and for metering usage between peers and peer groups 304. The peer-to-peer platform may also provide a mechanism for tracking peers and peer groups 304, and for establishing a control policy between peers and in peer groups 304. The peer-to-peer platform may also provide a security layer for verifying and authorizing peers that wish to connect to other peers or peer groups 304.

In one embodiment, peers (and therefore the entire collective platform of peers) may be defined by:
 a set of protocols implemented, and used by the peer;
 an underlying software platform and network transports used by the peer;
 rules and conventions governing the peer's role in the platform; and
 a set of resources produced (exported to others) and consumed (imported from others) by the peer.

The peer-to-peer platform protocols may provide inter-operability between compliant software components (executing on potentially heterogeneous peer runtimes). The term compliant may refer to a single protocol or multiple protocols. That is, some peers may not implement all the defined protocols. Furthermore, some peers may only use a portion (client-side or server-side only) of a particular protocol. The protocols defined by the peer-to-peer protocol may be realized over a network. Networks that may support the peer-to-peer platform protocols may include, but are not limited to, wireless and wired networks such as the Internet, a corporate intranet, Local Area Networks (LANs), Wide Area Networks (WANS), and dynamic proximity networks. One or more of the protocols of the peer-to-peer platform may also be used within a single computer. The size and complexity of the network nodes supporting these protocols may range from a simple light switch to a complex, highly available server and even to mainframe and supercomputers.

In one embodiment, the distance, latency, and implementation of peer software is not specified by the peer-to-peer platform protocols, only a common discovery and communication methodology, creating a "black box" effect. The definitions of protocol and peer software implementation issues may be referred to as a binding. A binding may describe how the protocols are bound to an underlying network transport (like TCP/IP or UDP/IP) or to a software platform such as UNIX or Java.

Peers that wish to cooperate and communicate with each other via the peer-to-peer platform may do so by following a set of rules and conventions called a policy. Each policy may orchestrate the use of one or more protocols operating on a set of platform resources. A common policy adopted by peers with different implementations may allow the peers to appear as a single distributed system. The policies may range from tightly-coupled to loosely-coupled policies. Tightly-coupled policies may create tightly-coupled systems. Loosely-coupled policies may create loosely coupled systems. The policies may rely on the set of protocols provided by the peer-to-peer platform. In one embodiment, some policies may be standard and operate in a wide variety of deployments. These standard policies may be referred to as the peer-to-peer platform standard policies. In one embodiment, custom policies may be supported. Policies may offer a means of tailoring the peer-to-peer platform to a problem, using centralized, decentralized, or hybrid approaches where appropriate. In one embodiment, these policies may be made open to all vendors, software developers, and IT managers as a means of adapting peer-to-peer platform to a networking environment and to the problem at hand.

In one embodiment, the peer-to-peer platform core protocols may be decentralized, enabling peer-to-peer discovery and communication. One embodiment provides standard plug-in policy types that may offer the ability to mix-in centralization as a means of enabling:
 Efficient long-distance peer lookup and rendezvous using peer naming and discovery policies;
 Simple, low-cost information search and indexing using sharing policies; and
 Inter-operability with existing centralized networking infrastructure and security authorities in networks such as corporate, public, private, or university networks using administration policies.

In one embodiment, a network node using the peer-to-peer platform (i.e. a peer) may provide one or more advertisement documents. Each advertisement document may represent a resource somewhere on the peer, or even on another device or peer. In one embodiment, all advertisement documents may be defined in a markup language such as XML and therefore may be software platform neutral. Each document may be converted to and from a platform specific representation such as a Java object. The manner in which the conversion takes place may be described in the software platform binding.

In one embodiment, the peer-to-peer platform may allow software implementation issues to be dealt with by the underlying software platform (e.g. Java, UNIX, or Windows). The combination of standard policies, platform resource advertisements, and flexible binding practices may yield a flexible system that may scale to Internet proportions.

In one embodiment, the peer-to-peer platform architecture may be defined in terms of its protocols, resource advertisements, and standard policies. The peer-to-peer platform protocols may be realized within various software platforms, such as the Java platform. Network protocol bindings may serve to ensure inter-operability with existing content transfer protocols, network transports, routers, and firewalls. Software platform bindings may describe how protocol stacks are implemented, and how advertisements are converted to and from language constructs (such as objects) that represent the advertised resource (such as a peer group). In one embodiment, the Java platform may be used to create Java-based peer-to-peer platform peers. HTTP is a common reliable content transfer protocol that may be used in the peer-to-peer platform. Other content transfer protocols may also be supported. TCP is a common reliable connection protocol that may be used in the peer-to-peer platform. Other connection protocols may also be supported. UDP is a common Datagram message protocol that may be used in the peer-to-peer platform. Other message protocols may also be supported.

The peer-to-peer platform may mold distinct network nodes called peers into a coherent, yet distributed peer-to-peer network computing platform. In preferred embodiments, the platform may have no single point of configuration, no single point of entry, and no single point of failure. In one embodiment, the peer-to-peer network computing platform may be completely decentralized, and may become more robust as it expands through the addition of network nodes. Unlike tightly-coupled systems, the high level of robustness delivered by peer-to-peer platform may be achieved without sacrificing simplicity. The peer-to-peer platform may be a very simple platform that preferably does not rely on high-speed interconnects, complex operating systems, large disk farms, or any other technology on which traditional tightly-coupled systems rely.

Network nodes (called peers) of various kinds may join the platform by implementing one or more of the platform's protocols. Various nodes including, but not limited to, Java, SPARC, x86, PowerPC, and ARM-based nodes may all be placed on an equal footing as "peers", with no one node type favored over any other node type. Each peer may operate independently of any other peer, providing a degree of reliability not commonly found in tightly-coupled homogeneous systems. Peers may discover each other on the network in order to form loosely-coupled relationships.

Peers may contain software components that act as clients and services that request and provide platform functions respectively. A software component may act as a client, a service, or both. The peer-to-peer platform may recognize different kinds of software components within a peer including, but not limited to:

- policies—a policy is a named behavior, rule, or convention that is to be followed by each member of a peer group (may or may not be loadable from the network and/or a storage medium such as a disk);
- clients—a client is a software component that may request a platform function by invoking a protocol;
- services—a service is a named, loadable library of code providing a platform function. a service may be viewed as a means of encapsulating a policy implementation; and
- applications—an application is a named, loadable service that interacts with a user, for example using a GUI.

Figure 10:
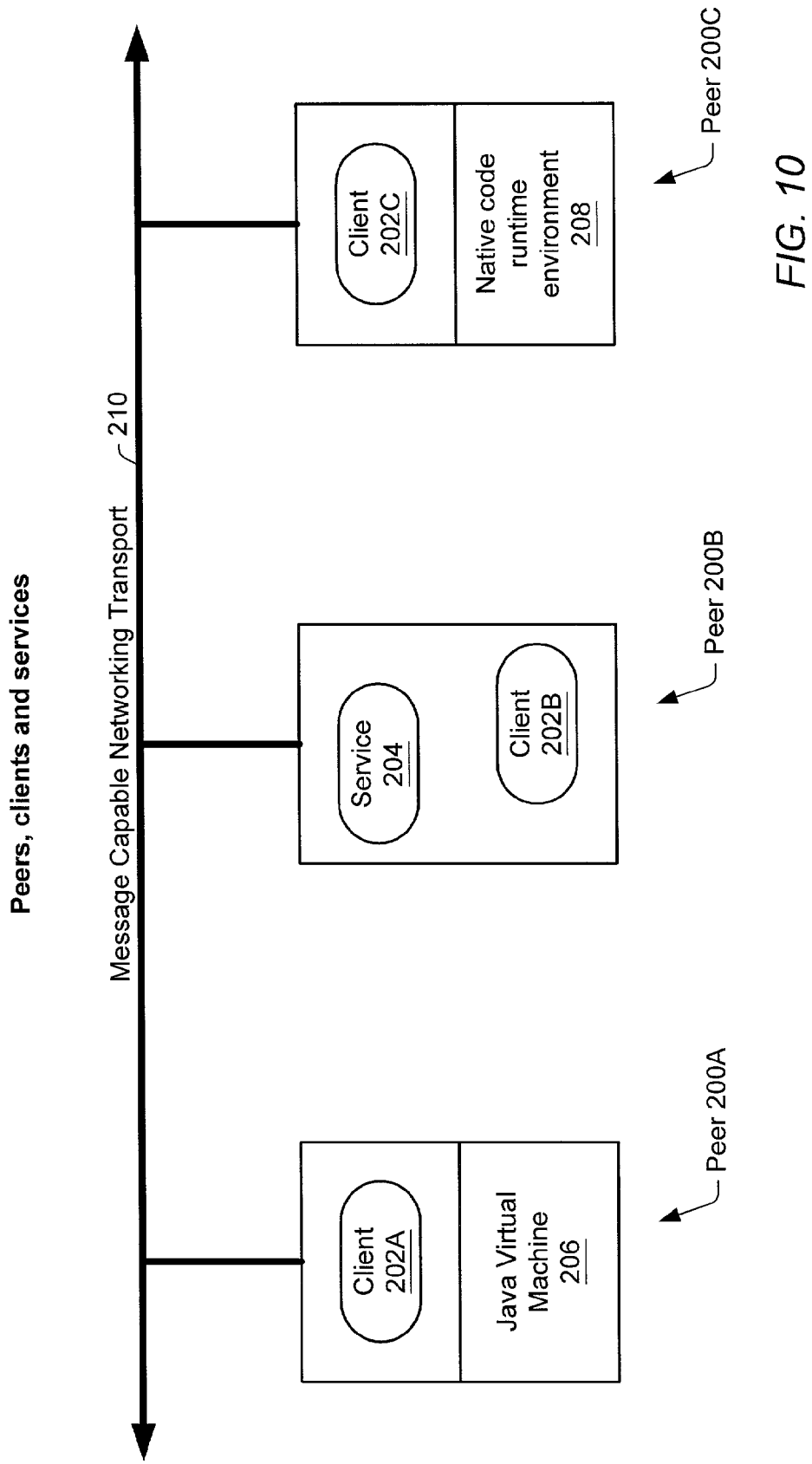
FIG. 10 illustrates an example of several peers in a peer-to-peer network according to one embodiment.

FIG. 10 illustrates an example of several peers 200 in a peer-to-peer network according to one embodiment. Peer 200A may be executing a Java Virtual Machine (JVM) 206, and client 202A may be executing on the JVM 206. Peer 200C may be executing a native code runtime environment 208, and client 202C may be executing within the environment 208. Peer 200B may include a client 202B and a service 204. Peer 200B may provide advertisement to service 204. Clients 202A and 202C may request and, if authorized, be granted access to service 204. Client 202B may also access service 204.

In one embodiment, peer-to-peer protocols may be embodied as markup language (e.g. XML) messages sent between peer software components acting as clients and services. Peer-to-peer platform messages may define the protocol used to connect the components, and may also be used to address resources offered by the component. The use of policies and messages to define a protocol allows many different kinds of nodes to participate in the protocol. Each node may be free to implement the protocol in a manner best suited to the node's abilities and role(s). For example, not all nodes may be capable of supporting a Java runtime environment; the protocol definition may not require or imply the use of Java on a node.

In one embodiment, the peer-to-peer platform may use markup language (e.g. XML) messages as a basis for providing Internet-scalable peer-to-peer communication. Each peer's messaging layer may asynchronously deliver an ordered sequence of bytes from client to service, using a networking transport. The messaging layer may maintain the notion (on both client and service) that the sequence of bytes is one atomic unit. In one embodiment, messages are sent to endpoints. An endpoint is a destination (e.g. a Uniform Resource Identifier (URI)) on any networking transport capable of sending and receiving Datagram-style messages. In one embodiment, the peer-to-peer platform does not assume that the networking transport is IP-based. The messaging layer may use the transport specified by the URI to send and receive messages. Both reliable connection-based transports such as TCP/IP and unreliable connectionless transports like UDP/IP may be supported. Other message transports such as IRDA, and emerging transports like Bluetooth may also be supported by using this endpoint addressing scheme.

In one embodiment, peer-to-peer platform messages are Datagrams that may contain an envelope, a stack of protocol headers with bodies, and an optional trailer. In one embodiment, the envelope may contain a header, a message digest, a source endpoint (optional), and destination endpoint. In on embodiment, each protocol header includes a <tag> naming the protocol in use and a body length. In one embodiment, a protocol body may have a variable length amount of bytes that is protocol <tag> dependent. In one embodiment, a protocol body may include one or more credentials used to identify the sender to the receiver. In one embodiment, a variable-length trailer (could be zero) consisting of auditing information may be piggybacked on a message. The trailer size may be computed by subtracting the body size and envelope size from the total size specified in the envelope. In one embodiment, the right to piggyback trailer information may be regulated by the messaging credentials in the message. When an unreliable networking transport is used, each message may be delivered once to the destination, may be delivered more than once to the destination, or may not arrive at the destination. On an unreliable networking transport, messages may arrive at a destination in a different order than sent.

Policies, applications and services layered upon the core protocols are responsible for message reordering, duplicate message removal, and for processing acknowledgement messages that indicate some previously sent message actually arrived at a peer. Regardless of transport, a message may be unicasted (point-to-point) between two peers. Messages may also be broadcasted (like a multicast) to a peer group. In one embodiment, no multicast support in the underlying transport is required.

One embodiment of a peer-to-peer protocol may support credentials in messages. A credential is a key that, when presented in a message body, is used to identify a sender and to verify that sender's right to send the message to the specified endpoint. The credential is an opaque token that may be presented each time a message is sent. The sending address placed in the message envelope may be cross-checked with the sender's identity in the credential. In one embodiment, credentials may be stored in the message body on a per-protocol <tag> basis. In one embodiment, each credential's implementation may be specified as a plug-in policy, which may allow multiple authentication policies to coexist on the same network.

Figures 11, 12:
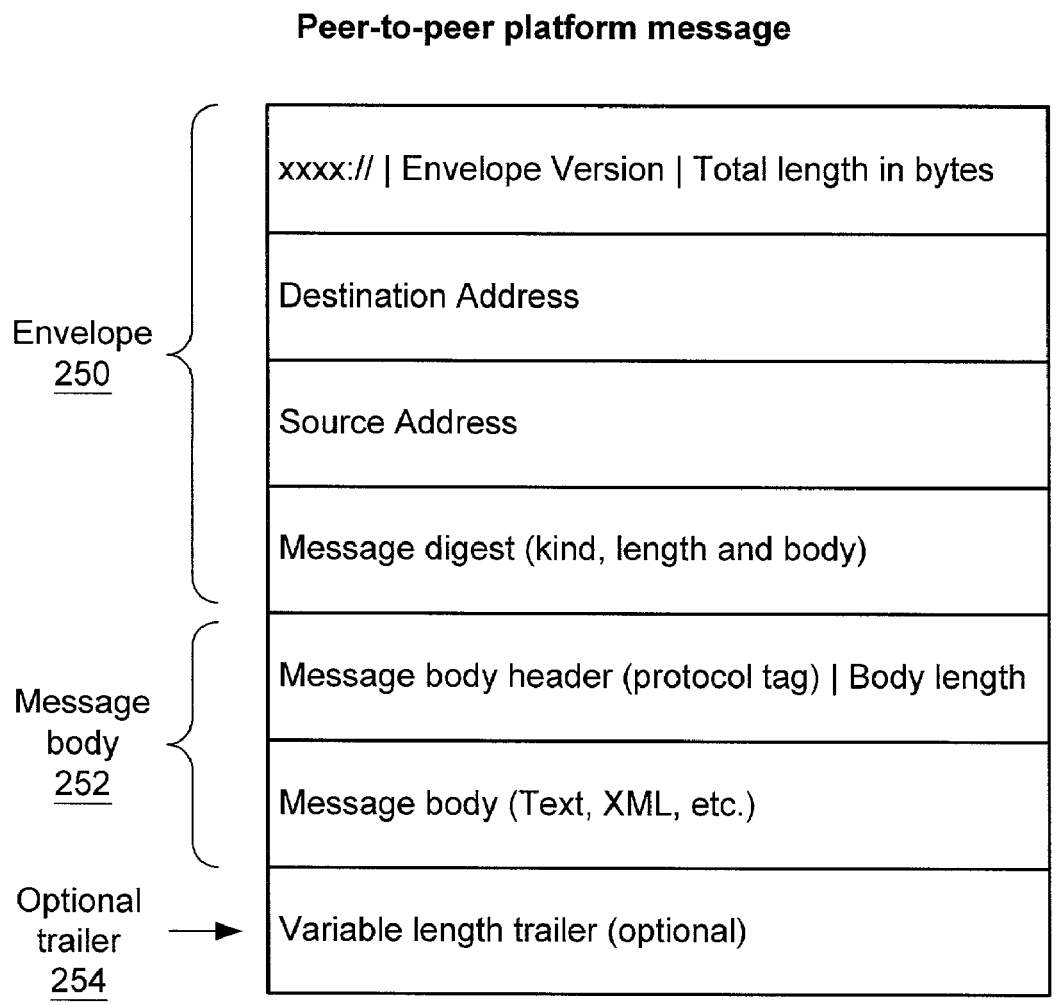
FIG. 11 illustrates a message with envelope, message body, and optional trailer according to one embodiment.
FIG. 12 illustrates an exemplary content identifier according to one embodiment.

In one embodiment, peer-to-peer platform messages may be defined in a markup language such as XML. FIG. 11 illustrates a message with envelope 250, message body 252, and optional trailer 254 according to one embodiment. A message may include multiple message bodies 252.

The peer-to-peer platform may provide pipes for information exchange between peers. A pipe encapsulates a message-based protocol and a dynamic set of endpoints. In one embodiment, a pipe requires that the encapsulated protocol be unidirectional, asynchronous, and stateless. Pipes connect one or more peer endpoints. In one embodiment, at each endpoint, software to send or receive, as well as to manage associated queues or buffers, is assumed, but not mandated. These pipe endpoints may be referred to as pipe input and output endpoints. In one embodiment, a pipe may be associated with a group and not with individual peers. Peer communication endpoints (both input and output) may be bound and unbound from a pipe in a dynamic fashion, providing an abstract "in and out" mailbox that is independent of any single peer. When a message is sent into a pipe, the message may be sent to all peer endpoints currently connected (listening) to the pipe. In one embodiment, the set of currently connected endpoints may be obtained using a pipe resolver protocol. In one embodiment, a pipe may offer point-to-point communication. A point-to-point pipe connects two peer endpoints together, i.e. an input endpoint that receives messages sent from the output endpoint. In one embodiment, no reply operation is supported. Additional information in the message payload (like a unique identifier) may be needed to thread message sequences. In one embodiment, a pipe may offer broadcast communication. A broadcast pipe may connect multiple input and output peer endpoints together. Messages flow into the pipe from output endpoints and pass by listening input endpoints. A broadcast message is sent to all listening endpoints simultaneously. This process may actually create multiple copies of the message to be sent. In one embodiment, when peer groups map to underlying physical subnets in a one-to-one fashion, transport multicast may also be used as an implementation optimization provided by pipes.

In a peer-to-peer network platform, peers may cooperate and communicate in peer groups that follow rules and conventions known as policies. Each cooperation or communication policy may be embodied as a named behavior, rule, or convention that may be followed by each member of a peer group. The behavior is typically encapsulated in a body of code packaged, for example, as a dynamic link library (DLL) or Java Archive (JAR) file, but any embodiment is allowed. In one embodiment, a policy name may include a canonical name string and a series of descriptive keywords that uniquely identifies the policy. In order to use a policy, a peer may locate an implementation suitable for the peer's runtime environment. Multiple implementations of the same policy allow Java and other non-native peers to use Java (or other) code implementations, and native peers can use native code implementations. In one embodiment, a standard policy resolver protocol may be used to find active (i.e. running on some peer) and inactive (i.e. not running, but present on some peer) implementations. In one embodiment, once an implementation has been activated, the policy resolver may be used in an ongoing manner to perform Inter-Policy Communication (IPC) without having to create a pipe. Low-level policies, in particular, may need a communication mechanism that does not rely on pipes. The pipe transport policy for example, may not be able to use a pipe to communicate with instances of itself. In one embodiment, policy implementations may be preconfigured into a peer or may be loaded from the network. In one embodiment, the process of finding, downloading and installing a policy implementation from the network may be similar to performing a search on the Internet for a web page, retrieving the page, and then installing the required plug-in. Once a policy is installed and activated, pipes or the policy resolver protocol may be used by the implementation to communicate with all instances of the same policy.

In one embodiment, a policy may have a name that indicates the type and/or purpose of the policy. An optional set of keywords may further describe the policy. In one embodiment, the name and keyword elements may be stored within a markup language (e.g. XML) policy advertisement document. Each policy advertisement document may be embedded in a peer group's advertisement document. In one embodiment, a policy advertisement may provide the policy resolver with only a portion of the search criteria needed to find a suitable implementation. The other information needed to execute a successful policy search may include a peer advertisement. In one embodiment, a peer advertisement may include, but is not limited to, a peer's:

communication endpoints (addresses on its active network transports);

runtime name (Java, SPARC, x86, etc.);

additional runtime constraints and requirements (optional);

peer name (optional); and security policies (optional).

In one embodiment, a peer group may include two or more cooperating peers that adhere to one or more policies. In one embodiment, the peer-to-peer platform does not dictate when, where, or why to create a peer group. The kinds of peer groups found in the platform are determined by the set of policies assigned to those groups. In one embodiment, peers wishing to join a peer group may first locate a current member of the peer group, and then request to join the peer group. The application to join may either be rejected or accepted by one or more of the current members. In one embodiment, membership acceptance policies may enforce a vote, or alternatively may elect one or more designated group representatives to accept or reject new membership applications. The peer-to-peer platform recognizes several motivations for creating or joining peer groups including, but not limited to, communication and content sharing.

One embodiment of the peer-to-peer platform may provide support for communication and content sharing groups including, but not limited to, the ability to find nearby peers, the ability to find named peers anywhere on the peer-to-peer platform, the ability to find named peer groups anywhere on the peer-to-peer platform, and the ability to find and exchange shared content.

One embodiment of the peer-to-peer platform may provide a discovery policy that may be used to search for peers, and peer groups 304. The search criteria may include a peer or peer group name (string). One embodiment of the peer-to-peer platform may provide an authentication policy that may be used to validate, distribute, and authenticate a group member's credentials. The authentication policy may define the type of credential used in the message-based protocols used within the peer group. The authentication policy may be the initial point of connection (like a login) for all new group members.

One embodiment of the peer-to-peer platform may provide a membership policy that may be used by the current members to reject or accept a new group membership application. Current members may use the membership policy during the login process. One embodiment of the peer-to-peer platform may provide a content sharing policy that may define the rules for content exchange. Each peer in a group may store content. The sharing policy may encapsulate such behaviors as access, replication, and searching.

One embodiment of the peer-to-peer platform may provide a policy resolver policy that may be used to execute the implementation search. Once the implementation is activated, the resolver may maintain its name and status within the peer and respond to requests to find active policies. One embodiment of the peer-to-peer platform may provide a pipe resolver policy that may be used to locate all the peers using (e.g. bound to) a specific pipe.

Network peer groups may be formed based upon the proximity of one peer to another peer. Proximity-based peer groups may serve to subdivide the network into abstract regions. A region may serve as a placeholder for general communication and security policies that deal with existing networking infrastructure, communication scopes and security requirements. In one embodiment, the peer-to-peer platform may include a network peer group discovery protocol that may be used by peers to find network regions and to obtain a region's peer group advertisement document.

As an individual peer boots, it may use the network peer group discovery protocol to determine information including, but not limited to:

what network region the peer is attached to;

what policies are associated with this region of the network. In one embodiment, administration and security policies may be embedded within the net peer group advertisement to help peers identify which policies may be required within the local existing network infrastructure;

what other peers are attached to this same network region; and what services exist on those other peers attached to this same network region.

The network regions are virtual regions. In other words, their boundaries may or may not reflect any underlying physical network boundaries such as those imposed by routers and firewalls. In one embodiment, the concept of a region may virtualize the notion of routers and firewalls, subdividing the network in a self-organizing fashion without respect to actual physical network boundaries.

Content peer groups may be formed primarily to share resources. Resources may include, but are not limited to, hardware and software resources such as files, services, disks, chat messages, applications, and printers, among others. Content peer groups may include peers from any network peer group, or even peers that do not belong to a network peer group. The rules of sharing content may be determined by the peer group's content sharing policy. Each peer in the content peer group may store a portion of the overall group content. Peers may work together to search, index, and update the collective content. The use of filenames to identify shared content may cause problems including naming collisions. In one embodiment, the peer-to-peer platform addresses this shared content naming problem by letting services and applications use metadata to describe shared content. The metadata may contain much more specific information (e.g. XML-typed information) that may prevent collisions and improve search accuracy. Furthermore, in one embodiment, multiple metadata descriptors (called content advertisements) may be used to identify a single instance of shared content. Allowing multiple advertisements enables applications and services to describe content in a very personal, custom manner that may enable greater search accuracy in any language.

The peer-to-peer platform's security model may be orthogonal to the concepts of peers, policies, peer groups 304, and pipes in the peer-to-peer platform. In one embodiment, security in the peer-to-peer platform may include, but is not limited to:

credentials—a credential is an opaque token that may provide an identity and a set of associated capabilities;

authenticators—an authenticator is code that may receive messages that either request a new credential or request that an existing credential be validated; and policies—security policies at both the network and content peer group level may provide a comprehensive security model that controls peer-to-peer communication as well as content sharing.

In one embodiment, all messages may include a network peer group credential that identifies the sender of the message as a full member in good standing. In addition to this low-level communication credential, content peer groups may define membership credentials that define a member's rights, privileges, and role within the group and content access and sharing credentials that define a member's rights to the content stored within the group.

One motivation for grouping peers together is to share content. Types of content items that may be shared include, but are not limited to, files such as text files, structured documents such as PDF and XML files, and active content like a network service. In one embodiment, content may be shared among group members, but not groups, and thus no single item of content may belong to more than one group. In one embodiment, each item of content may have a unique identifier also known as its canonical name. This name may include a peer group universal unique identifier (UUID) and another name that may be computed, parsed, and maintained by peer group members. In one embodiment, the content's name implementation within the peer group is not mandated by the peer-to-peer platform. The name may be a hash code, a URI, or a name generated by any suitable means of uniquely identifying content within a peer group. The entire canonical content name may be referred to as a content identifier. FIG. 12 illustrates an exemplary content identifier according to one embodiment. In one embodiment, a content item may be advertised to make the item's existence known and available to group members through the use of content advertisements.

Each peer group member may share content with other members using a sharing policy that may name or rely on a sharing protocol. The default content sharing protocol may be a standard peer group sharing protocol of the peer-to-peer platform. Higher-level content systems such as file systems and databases may be layered upon the peer group sharing protocol. In on embodiment, the peer group sharing protocol is a standard policy embodied as a core protocol. In one embodiment, higher-level content protocols are optional and may be mandated by a custom policy and not the peer-to-peer platform.

Figure 13:
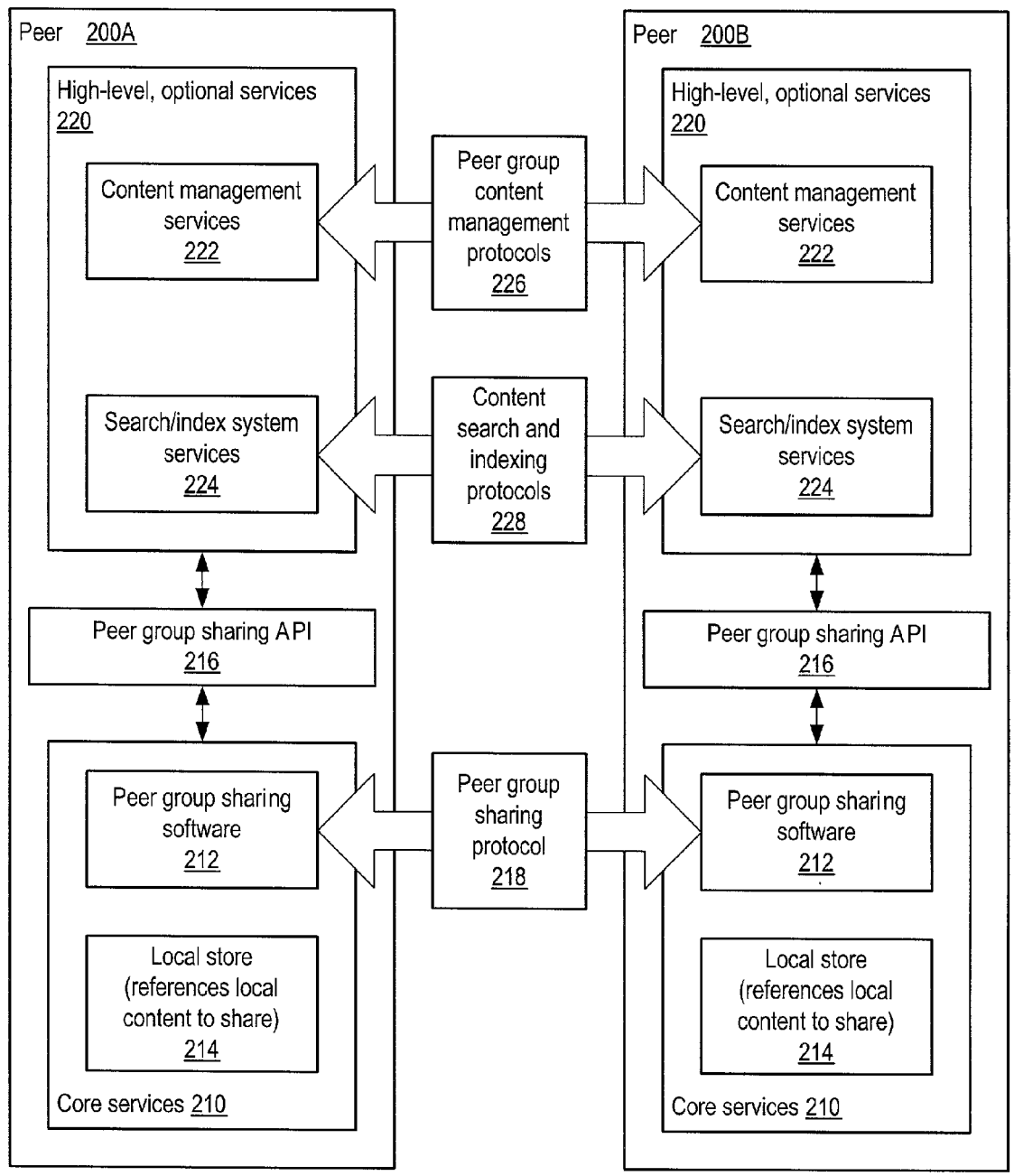
FIG. 13 is a block diagram illustrating two peers using a layered sharing policy and protocols to share content according to one embodiment.

FIG. 13 is a block diagram illustrating two peers using a layered sharing policy and several protocols to share content according to one embodiment. Each peer 200 includes core services 210 and one or more high-level, optional services 220. Core services 210 may include peer group sharing software that may be used to access a local store 214 (e.g. sharable content). High-level services 220 may include such services as the content management services 222 and the search and index system services 224 of this illustration. The core services 210 and high-level services 220 interface through a peer group sharing API 216 to the peer group sharing software 212. The peer group sharing software 212 on the two peers 200 may interface to each other using the low-level peer group sharing protocol 218. High-level services 220 may interface using higher-level protocols. For example, the content management services 222 on the two peers may interface using peer group content management protocols 226, and the search and index system services 224 may interface using content search and indexing protocols 228.

An instance of content may be defined as a copy of an item of content. Each content copy may reside on a different peer in the peer group. The copies may differ in their encoding type. HTML, XML and WML are examples of encoding types. These copies may have the same content identifier, and may even exist on the same peer. An encoding metadata element may be used to differentiate the two copies. Each copy may have the same content identifier as well as a similar set of elements and attributes. Making copies of content on different peers may help any single item of content be more available. For example, if an item has two instances residing on two different peers, only one of the peers needs to be alive and respond to the content request. In one embodiment, whether to copy an item of content may be a policy decision that may be encapsulated in higher-level applications and services.

One embodiment of the peer-to-peer platform may provide a content management service. A content management service is a non-core (high-level) service that uses the peer group sharing protocol to facilitate content sharing. In one embodiment, the peer group sharing protocol does not mandate sharing policies regarding the replication of content, the tracking of content, metadata content (including indexes), and content relationship graphs (such as a hierarchy). In one embodiment, the content management service may provide these extra features.

Items of content that represent a network service may be referred to as active content. These items may have additional core elements above and beyond the basic elements used for identification and advertisement. Active content items may be recognized by Multi-Purpose Internet Mail Extensions (MIME) content type and subtype. In one embodiment, all peer-to-peer platform active contents may have the same type. In one embodiment, the subtype of an active content may be defined by network service providers and may be used to imply the additional core elements belonging to active content documents. In one embodiment, the peer-to-peer platform may give latitude to service providers in this regard, yielding many service implementation possibilities. Some typical kinds of elements associated with a network service may include, but are not limited to:

lifecycle elements—an instance of active content may adhere to a lifecycle. A lifecycle element defines a set of behavior states such as started and stopped. The lifecycle element may itemize the service's lifecycle and a set of instructions used to manipulate the lifecycle;

runtime elements—runtime elements define the set of local peer runtimes in which this active content can execute (e.g. Java, Solaris, win32 . . . );

user interface elements—a user interface element defines the policy or policies by which a user interface is displayed;

configuration elements—a configuration element defines the policy or policies by which the service may be configured; and Storage elements—a storage element defines the policy or policies the service may use for persistent and/or transient storage.

As previously discussed, each peer may have a core protocol stack, a set of policies and one or more services. In one embodiment, the peer-to-peer platform may define a standard service advertisement. In one embodiment, the standard service advertisement may include lifecycle, runtime, and configuration elements.

Some services may be applications. An application may have a user interface element and a storage element in addition to the lifecycle, runtime, and configuration elements. In one embodiment, a service advertisement may also include startup information. The startup information may direct the local core peer software as to how and when to start the service. For example, some services may be marked (in the advertisement) to start at boot, while others may be marked to start when a message arrives in a specific advertised pipe. In one embodiment, services marked to start when a message arrives in a specific advertised pipe may be used to implement daemon services that block in the background awaiting a message to arrive in an input pipe.

In one embodiment, the peer-to-peer platform recognizes two levels of network services: peer services and peer group services. Each level of service may follow the active content typing and advertisement paradigm, but each level may provide a different degree (level) of reliability. In one embodiment, a peer service may execute on a single peer network node only. If that node happens to fail, the service fails too. This level of service reliability may be acceptable for an embedded device, for example, providing a calendar and email client to a single user. A peer group service, on the other hand, may include a collection of cooperating peer services. If one peer service fails, the collective peer group service may not be affected, because chances are that one or more of the other peer services are healthy. Thus, a peer group service may provide consumers (client peers) a highly reliable, fault-tolerant cluster of identical service implementations, servicing multiple concurrent peer requests. Services of this kind may be defined as content within the peer group. Specific service instances (as represented by service advertisements) may be obtained using the peer information protocol. In one embodiment, peers have the option of contacting a specific service instance using the peer information protocol, or by contacting a group of services through a special active content policy.

One embodiment of the peer-to-peer platform may use advertisements. Advertisements are language-neutral abstract data structures. In one embodiment, advertisements may be defined in a markup language such as XML. In one embodiment, in accordance with a software platform binding, advertisements may be converted to and from native data structures such as Java objects or 'C' structs. In one embodiment, each protocol specification may describe one or more request and response message pairs. Advertisements may be documents exchanged in messages. The peer-to-peer platform may defines standard advertisement types including, but not limited to, policy advertisements, peer advertisements, peer group advertisements, pipe advertisements, service advertisements, and content advertisements. In one embodiment, subtypes may be formed from these basic types using schemas (e.g. XML schemas). Subtypes may add extra, richer metadata such as icons. In one embodiment, the peer-to-peer platform protocols, policies, and core software services may operate only on the basic abstract types.

In one embodiment, all peer-to-peer platform advertisements are represented in XML. XML may provide a means of representing data and metadata throughout a distributed system. XML may provide universal (software-platform neutral) data because it may be language agnostic, self-describing, strongly-typed and may ensure correct syntax. In one embodiment, the peer-to-peer platform may use XML for platform resource advertisements and for defining the messages exchanged in the protocol set. Existing content types (MIME) may be described using a level of indirection called metadata. All XML Advertisements may be strongly typed and validated using XML schemas. In one embodiment, only valid XML documents that descend from the base XML advertisement types may be accepted by peers supporting the various protocols requiring that advertisements be exchanged in messages. Another feature of XML is its ability to be translated in to other encodings such as HTML and WML. In one embodiment, this feature of XML may be used to provide support for peers that do not support XML to access advertised resources.

In one embodiment, advertisements may be composed of a series of hierarchically arranged elements. Each element may contain its data and/or additional elements. An element may also have attributes. Attributes may be name-value string pairs. An attribute may be used to store metadata, which may be used to describe the data within the element.

In one embodiment, peer-to-peer platform advertisements may contain elements including, but not limited to:

default language encoding element—in one embodiment, all human readable text strings are assumed to be of this encoding, unless otherwise denoted. As an example:
<default Language>en-CA</default Language> resource name (canonical name string containing a UUID)—in one embodiment, a unique 128-bit number naming the resource within the platform; and one or more <Peer Endpoint> elements used to access the resource. Peer endpoint elements may contain a network transport name (for example, a string followed by a '://') and a Peer address on transport (for example, a string).

Peer-to-peer platform advertisements may also contain one or more optional elements including, but not limited to, a resource provider description element and a resource provider security policy element. A resource provider description element may be a standard element that describes the provider of the resource. A resource provider security policy element may be a standard element that describes the provider's security.

A resource provider description element may include, but is not limited to:

a title (non-canonical string suitable for UI display)

a provider name (canonical name string containing a UUID)

a version (a string)

a URI to obtain additional Info (a string)

For example, a light switch service provider's description element might be:

<title>ABC Programmable Lighting Switch</title>
<provider>ABC, an XYZ Company</provider>
<version>1.0</version>
<additionalInfo>http://www.XYZ.Com/ABC/x10/</additionalInfo>

In one embodiment, the same set of descriptive information (title, provider name, version, and additional info URI) may be used throughout all advertisement types to describe the particular provider.

A resource provider security policy element may include, but is not limited to:

an authentication policy—an embedded policy advertisement that describes the manner in which this provider authenticates others; and a credentialing policy—an embedded policy advertisement. The provider's credentialing policy for enabling others to authenticate the provider.

A policy advertisement may describe a behavior, convention, or rule necessary to interact with a platform resource such as a pipe, service, or peer group. FIG. 14 illustrates one embodiment of a policy advertisement. A policy advertisement may be used to help find the proper policy implementation for the requesting peer. This advertisement document may be embedded in other types of advertisements. Policy statements made by this document may apply to any resource, service, or peer group in the platform. Policy and security are orthogonal concepts to peers, peer groups 304, content, and services in the peer-to-peer platform.

A peer advertisement describes a peer network node within the peer-to-peer platform. FIG. 15 illustrates one embodiment of a peer advertisement. A peer advertisement may be used to help find the proper policy implementation for the requesting peer.

A peer group advertisement describes a collection of cooperating peers. FIG. 16 illustrates one embodiment of a peer group advertisement. A peer group advertisement may define the group membership process. In one embodiment, more than one kind of peer group advertisements may exist for a single group. In one embodiment, some basic kinds of peer group advertisement (with information for non-members only) may be published most often on the platform. In one embodiment, the only common elements found in all kinds of peer group advertisements is one or more standard peer-to-peer platform policies. Once a peer joins a group, that peer may receive (depending upon the membership policy) a full membership-level advertisement. The full membership advertisement, for example, might include the policy (may be required of all members) to vote for new member approval.

A pipe advertisement describes an instance of a peer-to-peer communication channel. FIG. 17 illustrates one embodiment of a pipe advertisement. In one embodiment, a pipe advertisement document may be published and obtained using either the content sharing protocol or by embedding it within other advertisements such as a peer group advertisement.

A service advertisement describes an instance of peer behavior or protocol. FIG. 18 illustrates one embodiment of a service advertisement. In one embodiment, the core services, for example, are made available to the platform by publishing a service advertisement. This advertisement document may be published and obtained using the peer information protocol. In one embodiment, service advertisements may include one or more access policies that describe how to activate and/or use the service. The core peer services (that each peer implements in order to respond to protocol messages) may advertise their existence in this manner. In one embodiment, the access method for the core services may be a schema of valid XML messages accepted by the service.

A content advertisement describes an item of content stored somewhere in a peer group. FIG. 19 illustrates one embodiment of a content advertisement. A content advertisement may be obtained using the peer group sharing protocol. In one embodiment, all items of content have a content identifier. A content identifier may be a unique identifier also known as its canonical name. This name may include a peer group UUID and another name computed, parsed, and maintained by peer group members only. The content's name implementation within the peer group is not mandated by peer-to-peer platform. The name may be a hash code, a URI, or any suitable means of uniquely identifying content within a peer group. The entire canonical content name is referred to as a content identifier.

An item of content's data may be encoded "by value." In other words, the item contains an in-line document that holds the content's data. Alternatively, an item of content's data may be encoded "by reference." In other words, the item contains a URI referencing the actual document holding the data. A size element may be provided for items of content. In one embodiment, the size is the total size of the content in bytes. In one embodiment, the size is a long (unsigned 64-bits).

The "size", "by-value" and "by-reference" elements are three kinds of elements that may be stored in a content advertisement document. An unlimited number of other types of elements may be added to a content advertisement. An item of content may also contain elements including, but not limited to:

- type element—the MIME type (encoding is deduced from type) of the in-line or referenced data.
- aboutID element—if the advertised content is another advertisement (based upon its type), this is the content identifier of the referenced content. Otherwise, the element doesn't exist.
- Peer identifier element—if the advertised content is another advertisement (based upon its type), this is the peer endpoint (which is bound to a pipe) on which a specific instance of the content (identified by aboutID) may exist. In one embodiment, if an advertisement is to refer to no particular instance of content, this field may be NULL or the element doesn't exist. This field may be used to help the advertisement dereferencing process. Given the unreliable nature of peers, any peer named here may in fact not be available. When the referenced peer isn't available, a search of the peer group may be performed (e.g. by a content management service) to find another suitable instance of the same content by matching the content identifier named in the aboutID element.

FIG. 20 is a block diagram illustrating one embodiment of a network protocol stack in a peer-to-peer platform. In this embodiment, the peer-to-peer platform may include, but is not limited to, the following networking protocols:

- a network peer group discovery protocol 270 that allows a peer to discover and establish abstract network regions.
- a peer discovery protocol 272 that allows a peer to discover other peers and peer groups 304. This protocol may be used to find members of any kind of peer group, presumably to request membership.
- a resolver protocol 274 that allows a peer to find an implementation of a peer group behavior suitable for its node type (e.g. Java or native).
- a peer information protocol 276 that allows a peer to learn about other peers' capabilities and status.
- a peer group membership protocol 280 that allows a peer to join or leave peer groups 304, and to manage membership policies, rights and responsibilities.
- a peer group pipe protocol 282 that allows a peer group member to communicate with other members by exchanging Datagram messages, for example, on a Datagram message capable networking transport 288.
- a peer group content sharing protocol 284 that allows peer group members to share content.

Other embodiments may include other networking protocols, and/or may not include some of the protocols described in this embodiment.

As illustrated in FIG. 20, the core networking protocols 270–284 may be used as a basis for constructing other non-core protocols 286. Applications and services 288 may then be constructed that may use the core and non-core protocols to participate in the peer-to-peer platform.

In one embodiment, the peer-to-peer platform may provide different levels of security. The system and method for providing secure exchange of messages between peers in peer groups as described herein may be implemented as part of the security model of the peer-to-peer platform or may be implemented separately and work in conjunction with the security model to provide the secure exchange of data, including messages and other data such as files, between peers operating in the peer-to-peer environment provided by the peer-to-peer platform.

In one embodiment, APIs may be provided to access well known security mechanisms such as RSA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/ private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

In summary, a system and method for providing secured peer-to-peer chat in a peer-to-peer environment have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
    a first peer sending a message to a second peer on a peer-to-peer network, wherein the message indicates that the first peer is requesting a session with the second peer;
    the first peer sending a first public key to the second peer;
    the second peer receiving the first message;
    the second peer receiving the first public key;
    the second peer determining if a session with the first peer is to be established in response to the message indicating the first peer is requesting a session with the second peer;
    if it is determined that a session with the first peer is to be established:
        the second peer generating a first session key from the first public key;
        the second peer sending a message including the first session key to the first peer indicating that the second peer accepts the request for the session; and
        the first peer receiving the message including the first session key; and
        the first peer and the second peer using the first session key to encrypt and decrypt data exchanged between the first peer and the second peer to provide secure exchange of said data between the first peer and the second peer on the peer-to-peer network.

2. The method as recited in claim 1, wherein the data comprises one or more chat messages.

3. The method as recited in claim 1, wherein the data comprises one or more files.

4. The method as recited in claim 1, further comprising, if it is determined that a session with the first peer is not to be established, the second peer sending a message to the first peer indicating that the second peer rejects the request for the session.

5. The method as recited in claim 1, further comprising:
    if it is determined that a session with the first peer is to be established:
        encrypting the message including the first session key on the second peer using the first public key prior to said sending the message including the first session key; and
        decrypting the message including the first session key on the first peer using a private key corresponding to the first public key after said receiving the message including the first session key.

6. The method as recited in claim 1, further comprising:
    ending the session between the first peer and the second peer;
    establishing a new session between the first peer and the second peer subsequent to said ending the session; and
    generating a second session key for the new session, wherein the second session key is different than the first session key; and
    the first peer and the second peer using the second session key to encrypt and decrypt data exchanged between the first peer and the second peer in the new session to provide secure exchange of said data between the first peer and the second peer on the peer-to-peer network.

7. The method as recited in claim 6, wherein said generating a second session key for the new session comprises:
    the first peer generating a second public key;
    the first peer sending the second public key to the second peer on the peer-to-peer network;
    the second peer receiving the second public key; and
    the second peer generating the second session key from the second public key.

8. The method as recited in claim 7, further comprising:
    the second peer sending the second session key to the first peer; and
    the first peer receiving the second session key.

9. The method as recited in claim 1, wherein the session is a chat session.

10. The method as recited in claim 1, further comprising:
    a third peer sending a third public key to the first peer; and
    the first peer generating a third session key from the third public key, wherein only the first peer and the third peer possess the third session key.

11. The method as recited in claim 10, further comprising:
    the third peer sending a fourth public key to the second peer; and
    the second peer generating a fourth session key from the fourth public key, wherein only the second peer and the third peer possess the fourth session key.

12. The method as recited in claim 1, further comprising:
    a third peer on the peer-to-peer network joining the session; and
    providing the first session key to the third peer;
    wherein the third peer is configured to encrypt messages to be sent to the first peer and to the second peer using the first session key, and wherein the third peer is further configured to decrypt encrypted messages received from the first peer and from the second peer using the first session key.

13. The method as recited in claim 1, wherein the first public key and an associated private key are generated using the RSA (Rivest-Shamir-Adleman) algorithm.

14. The method as recited in claim 1, wherein the first peer and the second peer are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

15. A method comprising:
   a first peer sending a first public key to a second peer in a peer-to-peer network;
   the second peer receiving the first public key;
   the second peer generating a first session key from the first public key;
   the second peer sending the first session key to the first peer;
   the first peer receiving the first session key; and
   the first peer and the second peer using the first session key to encrypt and decrypt data exchanged between the first peer and the second peer to provide secure exchange of said data between the first peer and the second peer on the peer-to-peer network.

16. The method as recited in claim 15, wherein the data comprises one or more chat messages.

17. The method as recited in claim 15, wherein the data comprises one or more files.

18. The method as recited in claim 15, further comprising:
   encrypting the first session key on the second peer using the first public key prior to said sending the first session key; and
   decrypting the first session key on the first peer using a private key corresponding to the first public key after said receiving the first session key.

19. The method as recited in claim 15, further comprising:
   ending the session;
   sending a second public key from the first peer to the second peer in the peer-to-peer network;
   the second peer receiving the second public key;
   the second peer generating a second session key from the second public key, wherein the second session key is different than the first session key;
   the second peer sending the second session key to the first peer; and
   the first peer receiving the second session key;
   wherein only the first peer and the second peer possess the second session key.

20. The method as recited in claim 15, wherein the first peer and the second peer are participants in a chat session on the peer-to-peer network.

21. The method as recited in claim 15, further comprising:
   the first peer generating a third session key from a third public key of a third peer on the peer-to-peer network, wherein only the first peer and the third peer possess the third session key; and
   the second peer generating a fourth session key from a fourth public key of the third peer, wherein only the second peer and the third peer possess the fourth session key.

22. The method as recited in claim 15, further comprising providing the first session key to a third peer in the peer-to-peer network, wherein the third peer is configured to use the first session key in encrypting messages to be sent to the first peer and the second peer and for decrypting encrypted messages received from the first peer and the second peer.

23. The method as recited in claim 15, wherein the first public key and an associated private key are generated using the RSA (Rivest-Shamir-Adleman) algorithm.

24. The method as recited in claim 15, wherein the first peer and the second peer are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

25. A method comprising:
   a plurality of peers in a peer-to-peer network joining in a session;
   generating one or more session keys from one or more public keys of the plurality of peers, wherein the one or more session keys are configured for use by the plurality of peers to provide secure exchange of messages between peers in the session;
   wherein there are one or more unique pairs of the plurality of peers, wherein each unique pair of the plurality of peers shares a particular one of the one or more session keys, wherein the particular session key is generated from a public key of one of the particular pair of peers, and wherein only the particular pair of peers possesses the particular session key; and
   each of the one or more pairs of peers using the particular session key shared by the pair to encrypt and decrypt data exchanged between the peers in the pair to provide secure exchange of said data between the peers in the pair on the peer-to-peer network.

26. The method as recited in claim 25, wherein the data comprises one or more chat messages.

27. The method as recited in claim 25, wherein the public keys and associated private keys are generated using the RSA (Rivest-Shamir-Adleman) algorithm.

28. The method as recited in claim 25, wherein plurality of peers are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

29. A method comprising:
   a plurality of peers in a peer-to-peer network joining in a session;
   generating a session key from a public key of a first of the plurality of peers;
   providing the session key to each of the plurality of peers, wherein only the plurality of peers in the session possess the session key; and
   each of the plurality of peers in the session using the particular session key shared by the pair to encrypt and decrypt data exchanged between the peers in the session to provide secure exchange of said data among the peers in the session on the peer-to-peer network.

30. The method as recited in claim 29, wherein the data comprises one or more chat messages.

31. The method as recited in claim 29, wherein said generating a session key comprises:
the first peer sending the public key to a second of the plurality of peers; and
the second peer generating the session key.

32. The method as recited in claim 29, wherein plurality of peers are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

33. A peer-to-peer network comprising:
a plurality of network nodes coupled to the peer-to-peer network;
a first peer configured to execute on one of the network nodes coupled to the peer-to-peer network;
a second peer configured to execute on a different one of the network nodes coupled to the peer-to-peer network;
wherein the first peer is configured to:
send a message to the second peer requesting a session with the second peer; and
send a first public key to the second peer;
wherein the second peer is configured to:
receive the first message requesting a session;
receive the first public key;
determine if a session with the first peer is to be established in response to the message requesting a session;
if the second peer determines that a session with the first peer is to be established:
generate a first session key from the first public key;
send a second message to the first peer, wherein the second message indicates that the second peer accepts the request for the session; and
send the first session key to the first peer;
wherein the first peer is further configured to:
receive the second message;
receive the first session key; and
wherein the first peer and the second peer are further configured to use the first session key to encrypt and decrypt data exchanged between the first peer and the second peer to provide secure exchange of said data between the first peer and the second peer on the peer-to-peer network.

34. The peer-to-peer network as recited in claim 33, wherein the data comprises one or more chat messages.

35. The peer-to-peer network as recited in claim 33, wherein the data comprises one or more files.

36. The peer-to-peer network as recited in claim 33, wherein, if the second peer determines that a session with the first peer is not to be established, the second peer is further configured to send a message to the first peer indicating that the second peer rejects the request for the session.

37. The peer-to-peer network as recited in claim 33,
wherein the second peer is further configured to encrypt the first session key using the first public key prior to said sending the first session key; and
wherein the first peer is further configured to decrypt the encrypted first session key using a public key associated with the first public key after said receiving the first session key.

38. The peer-to-peer network as recited in claim 33, wherein the first peer and the second peer are further configured to:
end the session;
establish a new session between the first peer and the second peer subsequent to said ending the session; and
generate a second session key for the new session, wherein the second session key is different than the first session key; and
use the second session key to encrypt and decrypt data exchanged between the first peer and the second peer in the new session to provide secure exchange of said data between the first peer and the second peer on the peer-to-peer network
wherein, in said generating a second session key, the first peer is further configured to:
generate a second public key; and
send the second public key to the second peer on the peer-to-peer network;
wherein, in said generating a second session key, the second peer is further configured to:
receive the second public key; and
generate the second session key from the second public key.

39. The peer-to-peer network as recited in claim 33, wherein the session is a chat session.

40. The peer-to-peer network as recited in claim 33, further comprising:
a third peer configured to execute on one of the network nodes coupled to the peer-to-peer network, wherein the third peer is configured to send a third public key to the first peer; and
wherein the first peer is further configured to generate a third session key from the third public key, wherein only the first peer and the third peer possess the third session key.

41. The peer-to-peer network of claim 40,
wherein the third peer is further configured to send a fourth public key to the second peer;
wherein the second peer is further configured to generate a fourth session key from the fourth public key, wherein only the second peer and the third peer possess the fourth session key.

42. The peer-to-peer network as recited in claim 33, further comprising:
a third peer configured to execute on one of the network nodes coupled to the peer-to-peer network, wherein the third peer is configured to:
join the session;
receive the first session key; and
encrypt messages to be sent to the first peer or the second peer using the first session key; and
decrypt encrypted messages received from the first peer or the second peer using the first session key.

43. The peer-to-peer network as recited in claim 33, wherein the first public key and an associated private key are generated using the RSA (Rivest-Shamir-Adleman) algorithm.

44. The peer-to-peer network as recited in claim 33, wherein the first peer and the second peer are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

45. A peer-to-peer network comprising:
a plurality of network nodes coupled to the peer-to-peer network;
a first peer configured to execute on one of the network nodes coupled to the peer-to-peer network;
a second peer configured to execute on one of the network nodes coupled to the peer-to-peer network;
wherein the first peer is configured to send a first public key to the second peer;
wherein the second peer is configured to:
receive the first message;
generate a first session key from the first public key; and
send the first session key to the first peer; and
wherein the first peer is further configured to receive the first session key;
wherein the first peer and the second peer are further configured to use the first session key to encrypt and decrypt data exchanged between the first peer and the second peer to provide secure exchange of said data between the first peer and the second peer on the peer-to-peer network.

46. The peer-to-peer network as recited in claim 45, wherein the data comprises one or more chat messages.

47. The peer-to-peer network as recited in claim 45, wherein the data comprises one or more files.

48. The peer-to-peer network as recited in claim 45, further comprising:
wherein the second peer is further configured to encrypt the first session key using the first public key prior to said sending the first session key; and
wherein the first peer is further configured to decrypt the encrypted first session key using a public key associated with the first public key after said receiving first session key.

49. The peer-to-peer network as recited in claim 45,
wherein the first peer and the second peer are further configured to end the session;
wherein the first peer is further configured to send a second public key to the second peer;
wherein the second peer is further configured to:
receive the second public key;
generate a second session key from the second public key, wherein the second session key is different than the first session key; and
send the second session key to the first peer;
wherein the first peer is further configured to receive the fifth message including the second session key;
wherein the first peer and the second peer are further configured to use the second session key to encrypt and decrypt data exchanged between the first peer and the second peer in the new session to provide secure exchange of said data between the first peer and the second peer on the peer-to-peer network.

50. The peer-to-peer network as recited in claim 45, wherein the first peer and the second peer are participants in a chat session on the peer-to-peer network.

51. The peer-to-peer network as recited in claim 45, further comprising:
a third peer configured to execute on one of the network nodes coupled to the peer-to-peer network wherein the third peer is configured to send a third public key to the first peer;
wherein first peer is further configured to:
receive the third public key from the third peer; and
generate a third session key from the third public key;
wherein only the first peer and the third peer possess the third session key.

52. The peer-to-peer network of claim 51,
wherein the third peer is further configured to send a fourth public key to the second peer;
wherein the second peer is further configured to:
receive the fourth public key from the third peer; and
generate a fourth session key from the fourth public key;
wherein only the second peer and the third peer possess the fourth session key.

53. The peer-to-peer network as recited in claim 45, further comprising:
a third peer configured to execute on one of the network nodes coupled to the peer-to-peer network wherein the third peer is configured to:
receive the first session key; and
use the first session key for encrypting data to be sent to the first peer or the second peer and for decrypting encrypted data received from the first peer or the second peer.

54. The peer-to-peer network as recited in claim 45, wherein the first public key and an associated private key are generated using the RSA (Rivest-Shamir-Adleman) algorithm.

55. The peer-to-peer network as recited in claim 45, wherein the first peer and the second peer are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

56. A tangible, computer accessible medium comprising program instructions, wherein the program instructions are computer-executable to implement:
a first peer sending a first public key to a second peer in a peer-to-peer network;
the second peer receiving the first public key;
the second peer generating a first session key from the first public key;
the second peer sending the first session key to the first peer;
the first peer receiving the first session key; and
the first peer and the second peer using the first session key to encrypt and decrypt data exchanged between the first peer and the second peer to provide secure exchange of said data between the first peer and the second peer on the peer-to-peer network.

57. The tangible, computer accessible medium as recited in claim 56, wherein the data comprises one or more chat messages.

58. The tangible, computer accessible medium as recited in claim 56, wherein the data comprises one or more files.

59. The tangible, computer accessible medium as recited in claim 56, wherein the program instructions are further computer-executable to implement:
   encrypting the first session key on the second peer using the first public key prior to said sending the first session key; and
   decrypting the first session key on the first peer using a private key corresponding to the first public key after said receiving the first session key.

60. The tangible, computer accessible medium as recited in claim 56, wherein the program instructions are further computer-executable to implement:
   ending the session;
   sending a second public key from the first peer to the second peer in the peer-to-peer network;
   the second peer receiving the second public key;
   the second peer generating a second session key from the second public key, wherein the second session key is different than the first session key;
   the second peer sending the second session key to the first peer; and
   the first peer receiving the second session key;
   wherein only the first peer and the second peer possess the second session key.

61. The tangible, computer accessible medium as recited in claim 56, wherein the first peer and the second peer are participants in a chat session on the peer-to-peer network.

62. The tangible, computer accessible medium as recited in claim 56, wherein the program instructions are further computer-executable to implement:
   the first peer generating a third session key from a third public key of a third peer on the peer-to-peer network, wherein only the first peer and the third peer possess the third session key; and
   the second peer generating a fourth session key from a fourth public key of the third peer, wherein only the second peer and the third peer possess the fourth session key.

63. The tangible, computer accessible medium as recited in claim 56, further comprising providing the first session key to a third peer in the peer-to-peer network, wherein the third peer is configured to use the first session key in encrypting messages to be sent to the first peer and the second peer and for decrypting encrypted messages received from the first peer and the second peer.

64. The tangible, computer accessible medium as recited in claim 56, wherein the first public key and an associated private key are generated using the RSA (Rivest-Shamir-Adleman) algorithm.

65. The tangible, computer accessible medium as recited in claim 56, wherein the first peer and the second peer are configured to operate in accordance with a peer-to-peer platform in the peer-to-peer network, wherein the peer-to-peer platform includes one or more protocols configured for use in communications among peers participating in the peer-to-peer network, and wherein the peer-to-peer platform further includes one or more policies that define rules and conventions for the peers participating in the peer-to-peer network, wherein the one or more protocols include a peer group discovery protocol configured for use by a peer in identifying a particular network region the peer is attached to and for discovering other peers attached to the particular network region.

* * * * *